(12) United States Patent
Chen et al.

(10) Patent No.: US 10,491,917 B2
(45) Date of Patent: Nov. 26, 2019

(54) DECODER-SIDE MOTION VECTOR DERIVATION

(71) Applicant: QUALCOMM Incorporated, San Diego, CA (US)

(72) Inventors: Yi-Wen Chen, San Diego, CA (US); Kai Zhang, San Diego, CA (US); Xiang Li, San Diego, CA (US); Jianle Chen, San Diego, CA (US); Wei-Jung Chien, San Diego, CA (US); Hsiao-Chiang Chuang, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/927,952

(22) Filed: Mar. 21, 2018

(65) Prior Publication Data
US 2018/0278950 A1 Sep. 27, 2018

Related U.S. Application Data

(60) Provisional application No. 62/475,042, filed on Mar. 22, 2017.

(51) Int. Cl.
| H04N 19/513 | (2014.01) |
| H04N 19/159 | (2014.01) |
| H04N 19/176 | (2014.01) |
| H04N 19/44 | (2014.01) |
| H04N 19/577 | (2014.01) |

(52) U.S. Cl.
CPC ......... *H04N 19/513* (2014.11); *H04N 19/159* (2014.11); *H04N 19/176* (2014.11); *H04N 19/44* (2014.11); *H04N 19/577* (2014.11)

(58) Field of Classification Search
None
See application file for complete search history.

(56) References Cited

U.S. PATENT DOCUMENTS

| 2007/0242748 A1* | 10/2007 | Mahadevan | H04N 19/44 375/240.14 |
| 2011/0002390 A1* | 1/2011 | Chiu | H04N 19/56 375/240.16 |

(Continued)

FOREIGN PATENT DOCUMENTS

| WO | 2012125178 A1 | 9/2012 |
| WO | 2017036414 A1 | 3/2017 |

OTHER PUBLICATIONS

International Search Report and Written Opinion—PCT/US2018/023816—ISA/EPO—dated Jul. 3, 2018, 12 pp.

(Continued)

*Primary Examiner* — Rebecca A Volentine
(74) *Attorney, Agent, or Firm* — Shumaker & Sieffert, P.A.

(57) ABSTRACT

A device for decoding video data determines a block of video data is coded in an inter prediction mode; implicitly determines that a decoder-side motion vector derivation (DMVD) mode is enabled for the block of video data; determines motion information for the block of video data; uses the motion information to determine a reference block in accordance with the DMVD mode; and generates a predictive block for the block of video data based on the reference block.

18 Claims, 19 Drawing Sheets

(56) References Cited

U.S. PATENT DOCUMENTS

| | | | | |
|---|---|---|---|---|
| 2011/0176611 A1* | 7/2011 | Huang | ............... | H04N 19/56 375/240.16 |
| 2013/0208787 A1* | 8/2013 | Zheng | ............... | H04N 19/56 375/240.02 |
| 2013/0336407 A1* | 12/2013 | Chen | ............... | H04N 19/597 375/240.16 |
| 2014/0016704 A1* | 1/2014 | Lin | ............... | H04N 19/513 375/240.16 |
| 2015/0195562 A1* | 7/2015 | Li | ............... | H04N 19/523 375/240.02 |
| 2016/0286232 A1* | 9/2016 | Li | ............... | H04N 19/513 |
| 2016/0345011 A1* | 11/2016 | Naing | ............... | H04N 19/105 |

OTHER PUBLICATIONS

ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.

Wang et al., "High Efficiency Video Coding (HEVC) Defect Report," Joint Collaborative Team on Video Coding (JCT-VC) of ITU-T SG 16 WP 3 and ISO/IEC JTC 1/SC 29/WG 11, JCTVC-N1003-v1, 14th Meeting: Vienna, AT, Jul. 25-Aug. 2, 2013, 312 pp.

Chen J., et al., "Algorithm Description of Joint Exploration Test Model 5," Document: JVET-E1001_v2, Joint Video Exploration Team (JVET) of ITU-T SG 16 WP 3 and ISO/IEC JTC 1/SC 29/WG 11, 5th Meeting: Geneva, CH, Jan. 12-20, 2017, 44 Pages.

Kaiming H., et al., "Guided image filtering," IEEE Transactions on Pattern Analysis and Machine Intelligence, vol. 35, No. 6, Jun. 2013, pp. 1397-1409.

"Bilateral filter" retrieved from https://en.wikipedia.org/wiki/Bilateral_filter, accessed on Feb. 15, 2018, 4 Pages.

"Sum of absolute transformed differences" Wikipedia, retrieved from https://en.wikipedia.org/wiki/Sum_of_absolute_transformed_differences, accessed on Feb. 15, 2018, 1 Page.

Sullivan J., et al., "Overview of the High Efficiency Video Coding (HEVC) Standard," IEEE Transactions on Circuits and Systems for Video Technology, vol. 22, No. 12, Dec. 2012, pp. 1649-1668.

Yongbing L., et al., "Enhanced Template Matching in FRUC Mode," Document: JVET-E0035, Joint Video Exploration Team (JVET) of ITU-T SG 16 WP 3 and ISO/IEC JTC 1/SC 29/WG 11, 5th Meeting: Geneva, CH, Jan. 12-20, 2017, 4 Pages.

Seo, et al., "Simplification and improvements on FRUC," JVET-G0065, Joint Video Exploration Team (JVET) of ITU-T SG 16 WP 3 and ISO/IEC JTC 1/SC 29/WG 11, Jul. 13-21, 2017, 9 pp.

\* cited by examiner

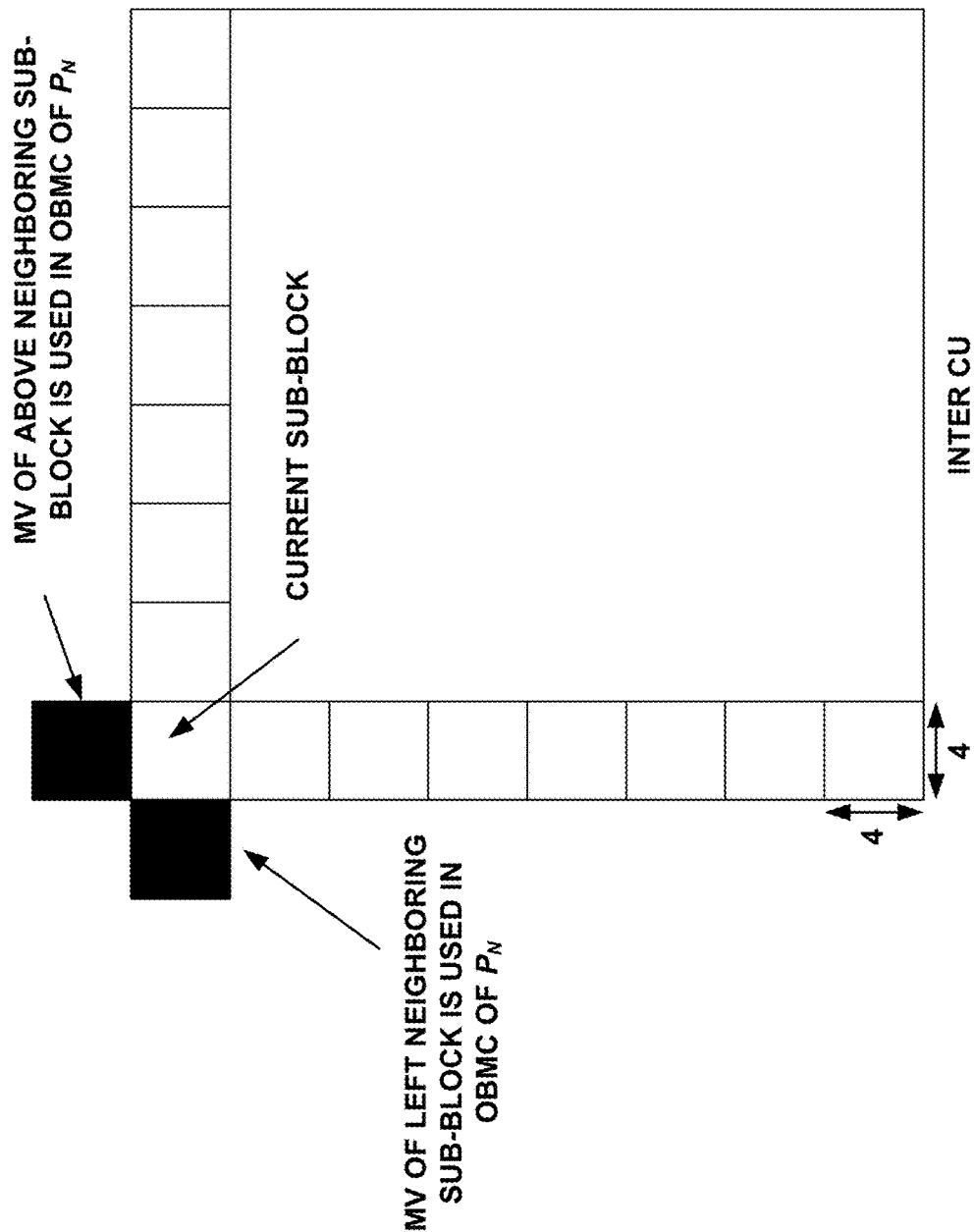

DECODER-SIDE MOTION VECTOR DERIVATION

This Application claims the benefit of U.S. Provisional Patent Application No. 62/475,042 filed 22 Mar. 2017, which is hereby incorporated by reference in its entirety.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the recently finalized High Efficiency Video Coding (HEVC) standard, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure describes techniques related to decoder-side motion vector derivation (DMVD), including techniques for deriving motion information (e.g., one or more motion vectors, a precision, and one or more reference picture indexes) used to encode blocks of video data and for determining by a video decoder the same motion information as that selected by the video encoder. Using the same (or reciprocal) derivation techniques used by the video encoder, a video decoder may determine, without receiving any syntax elements specifically identifying the motion information, what motion information was used to encode the video data.

In one example, a method includes determining a block of video data is coded in an inter prediction mode; implicitly determining that a decoder-side motion vector derivation (DMVD) mode is enabled for the block of video data; determining motion information for the block of video data; using the motion information, determining a reference block in accordance with the DMVD mode; and generating a predictive block for the block of video data based on the reference block.

In another example, a device for decoding video data includes a memory configured to store the video data and one or more processors configured to determine a block of video data is coded in an inter prediction mode; implicitly determine that a decoder-side motion vector derivation (DMVD) mode is enabled for the block of video data; determine motion information for the block of video data; use the motion information, determining a reference block in accordance with the DMVD mode; and generate a predictive block for the block of video data based on the reference block.

In another example, a computer-readable storage medium storing instructions that when executed by one or more processors cause the one or more processors to determine a block of video data is coded in an inter prediction mode; implicitly determine that a decoder-side motion vector derivation (DMVD) mode is enabled for the block of video data; determine motion information for the block of video data; use the motion information, determining a reference block in accordance with the DMVD mode; and generate a predictive block for the block of video data based on the reference block.

In another example, an apparatus for decoding video data includes means for determining a block of video data is coded in an inter prediction mode; means for implicitly determining that a decoder-side motion vector derivation (DMVD) mode is enabled for the block of video data; means for determining motion information for the block of video data; means for using the motion information, determining a reference block in accordance with the DMVD mode; and means for generating a predictive block for the block of video data based on the reference block.

The details of one or more examples of the disclosure are set forth in the accompanying drawings and the description below. Other features, objects, and advantages will be apparent from the description, drawings, and claims.

BRIEF DESCRIPTION OF DRAWINGS

FIGS. 10A and 10B are conceptual diagrams showing an example illustration of sub-blocks where overlapped block motion compensation may apply.

DETAILED DESCRIPTION

This disclosure describes techniques related to decoder-side motion vector derivation (DMVD). The techniques of this disclosure may be used in conjunction with existing video codecs, such as the High Efficiency Video Coding (HEVC) standard, or may be used as an efficient coding tool in any future video coding standards.

In general, this disclosure describes techniques for deriving motion information (e.g., one or more motion vectors, a precision, and one or more reference picture indexes) used to encode blocks of video data and for determining by a video decoder the same motion information as that selected by the video encoder. Using the same (or reciprocal) derivation techniques used by the video encoder, a video decoder may determine, without receiving any syntax elements specifically identifying the motion information, what motion information was used to encode the video data. In some coding scenarios, however, the video encoder may still explicitly encode some of the motion information used to encode the block.

Various techniques in this disclosure may be described with reference to a video coder, which is intended to be a generic term that can refer to either a video encoder or a video decoder. Unless explicitly stated otherwise, it should not be assumed that techniques described with respect to a video encoder or a video decoder cannot be performed by the other of a video encoder or a video decoder. For example, in many instances, a video decoder performs the same, or sometimes a reciprocal, coding technique as a video encoder in order to decode encoded video data. In many instances, a video encoder also includes a video decoding loop, and thus the video encoder performs video decoding as part of encoding video data. Thus, unless stated otherwise, the techniques described in this disclosure with respect to a video decoder may also be performed by a video encoder, and vice versa.

This disclosure may also use terms such as current layer, current block, current picture, current slice, etc. In the context of this disclosure, the term current is intended to identify a layer, block, picture, slice, etc. that is currently being coded, as opposed to, for example, previously coded layers, blocks, pictures, and slices or yet to be coded blocks, pictures, and slices.

Figure 1:
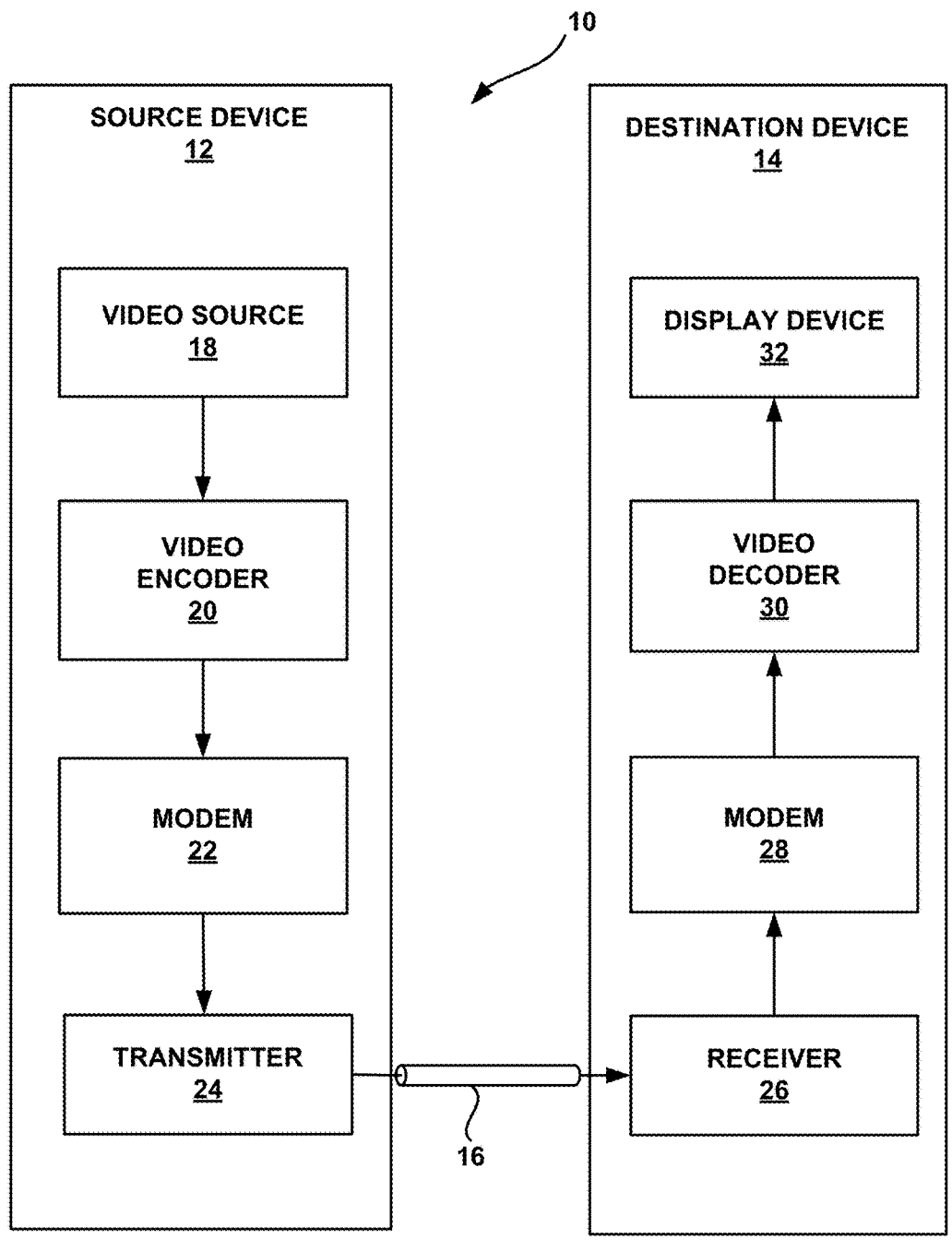
FIG. 1 is a block diagram illustrating an example video encoding and decoding system that may utilize the techniques of this disclosure for supporting decoder-side motion vector derivation.

FIG. 1 is a block diagram illustrating an example video encoding and decoding system 10 that may utilize the techniques described in this disclosure. As shown in FIG. 1, system 10 includes a source device 12 that generates encoded video data to be decoded at a later time by a destination device 14. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via a link 16. Link 16 may comprise any type of medium or device capable of moving the encoded video data from source device 12 to destination device 14. In one example, link 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In another example, encoded data may be output from output interface 22 to a storage device 26. Similarly, encoded data may be accessed from storage device 26 by input interface. Storage device 26 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 26 may correspond to a file server or another intermediate storage device that may hold the encoded video generated by source device 12. Destination device 14 may access stored video data from storage device 26 via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from storage device 26 may be a streaming transmission, a download transmission, or a combination of both.

The techniques of this disclosure are not necessarily limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes a video source 18, video encoder 20 and an output interface 22. In some cases, output interface 22 may include a modulator/demodulator (modem) and/or a transmitter. In source device 12, video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera, source device 12 and destination device 14 may form so-called camera phones or video phones. However, the techniques described in this disclosure may be applicable to video coding in general, and may be applied to wireless and/or wired applications.

The captured, pre-captured, or computer-generated video may be encoded by video encoder 20. The encoded video data may be transmitted directly to destination device 14 via output interface 22 of source device 12. The encoded video data may also (or alternatively) be stored onto storage device 26 for later access by destination device 14 or other devices, for decoding and/or playback.

Destination device 14 includes an input interface 28, a video decoder 30, and a display device 32. In some cases, input interface 28 may include a receiver and/or a modem. Input interface 28 of destination device 14 receives the encoded video data over link 16. The encoded video data communicated over link 16, or provided on storage device 26, may include a variety of syntax elements generated by video encoder 20 for use by a video decoder, such as video decoder 30, in decoding the video data. Such syntax elements may be included with the encoded video data transmitted on a communication medium, stored on a storage medium, or stored a file server.

Display device 32 may be integrated with, or external to, destination device 14. In some examples, destination device 14 may include an integrated display device and also be configured to interface with an external display device. In other examples, destination device 14 may be a display device. In general, display device 32 displays the decoded video data to a user, and may comprise any of a variety of display devices such as a liquid crystal display (LCD), a plasma display, an organic light emitting diode (OLED) display, or another type of display device.

Video encoder 20 and video decoder 30 may operate according to a video compression standard, such as HEVC standard, and may conform to the HEVC Test Model (HM). Video encoder 20 and video decoder 30 may additionally operate according to an HEVC extension, such as the range extension, the multiview extension (MV-HEVC), or the scalable extension (SHVC) which have been developed by the Joint Collaboration Team on Video Coding (JCT-VC) as well as Joint Collaboration Team on 3D Video Coding Extension Development (JCT-3V) of ITU-T Video Coding Experts Group (VCEG) and ISO/IEC Motion Picture Experts Group (MPEG).

Video encoder 20 and video decoder 30 may also operate according to other proprietary or industry standards, such as the ITU-T H.264 standard, alternatively referred to as ISO/IEC MPEG-4, Part 10, Advanced Video Coding (AVC), or extensions of such standards, such as the Scalable Video Coding (SVC) and Multi-view Video Coding (MVC) extensions. The techniques of this disclosure, however, are not limited to any particular coding standard. Other examples of video compression standards include ITU-T H.261, ISO/IEC MPEG-1 Visual, ITU-T H.262 or ISO/IEC MPEG-2 Visual, ITU-T H.263, and ISO/IEC MPEG-4 Visual.

ITU-T VCEG (Q6/16) and ISO/IEC MPEG (JTC 1/SC 29/WG 11) are now studying the potential need for standardization of future video coding technology with a compression capability that significantly exceeds that of the current HEVC standard (including its current extensions and near-term extensions for screen content coding and high-dynamic-range coding). The groups are working together on this exploration activity in a joint collaboration effort known as the Joint Video Exploration Team (JVET) to evaluate compression technology designs proposed by their experts in this area. The JVET first met during 19-21 Oct. 2015. And the latest version of reference software, i.e., Joint Exploration Model 5 (JEM 5) could be downloaded from: https://jvet.hhi.fraunhofer.de/svn/svn_HMJEMSoftware/tags/HM-16.6-JEM-5.0/. Algorithm description of Joint Exploration Test Model 5 (JEM5) may be referred to as JVET-E1001.

Techniques of this disclosure may utilize HEVC terminology for ease of explanation. It should not be assumed, however, that the techniques of this disclosure are limited to HEVC, and in fact, it is explicitly contemplated that the techniques of this disclosure may be implemented in successor standards to HEVC and its extensions. Video encoder 20 and video decoder 30 may encode and decode video data according to multiple standards.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

In HEVC and other video coding specifications, a video sequence typically includes a series of pictures. Pictures may also be referred to as "frames." In one example approach, a picture may include three sample arrays, denoted SL, Scb, and Scr. In such an example approach, SL is a two-dimensional array (i.e., a block) of luma samples. Scb is a two-dimensional array of Cb chrominance samples. Scr is a two-dimensional array of Cr chrominance samples. Chrominance samples may also be referred to herein as "chroma" samples. In other instances, a picture may be monochrome and may only include an array of luma samples.

To generate an encoded representation of a picture, video encoder 20 may generate a set of coding tree units (CTUs). Each of the CTUs may comprise a coding tree block of luma samples, two corresponding coding tree blocks of chroma samples, and syntax structures used to code the samples of the coding tree blocks. In monochrome pictures or pictures having three separate color planes, a CTU may comprise a single coding tree block and syntax structures used to code the samples of the coding tree block. A coding tree block may be an N×N block of samples. A CTU may also be referred to as a "tree block" or a "largest coding unit" (LCU). The CTUs of HEVC may be broadly analogous to the macroblocks of other standards, such as H.264/AVC. However, a CTU is not necessarily limited to a particular size and may include one or more coding units (CUs). A slice may include an integer number of CTUs ordered consecutively in a raster scan order.

To generate a coded CTU, video encoder 20 may recursively perform quad-tree partitioning on the coding tree blocks of a CTU to divide the coding tree blocks into coding blocks, hence the name "coding tree units." A coding block may be an N×N block of samples. A CU may comprise a coding block of luma samples and two corresponding coding blocks of chroma samples of a picture that has a luma sample array, a Cb sample array, and a Cr sample array, and syntax structures used to code the samples of the coding blocks. In monochrome pictures or pictures having three separate color planes, a CU may comprise a single coding block and syntax structures used to code the samples of the coding block.

Video encoder 20 may partition a coding block of a CU into one or more prediction blocks. A prediction block is a rectangular (i.e., square or non-square) block of samples on which the same prediction is applied. A prediction unit (PU) of a CU may comprise a prediction block of luma samples, two corresponding prediction blocks of chroma samples, and syntax structures used to predict the prediction blocks. In monochrome pictures or pictures having three separate color planes, a PU may comprise a single prediction block and syntax structures used to predict the prediction block. Video encoder 20 may generate predictive luma, Cb, and Cr blocks for luma, Cb, and Cr prediction blocks of each PU of the CU.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the picture associated with the PU. If video encoder 20 uses inter prediction to generate the predictive blocks of a PU, video encoder 20 may generate the predictive blocks of the PU based on decoded samples of one or more pictures other than the picture associated with the PU.

After video encoder 20 generates predictive luma, Cb, and Cr blocks for one or more PUs of a CU, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the CU's Cb residual block may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may use quad-tree partitioning to decompose the luma, Cb, and Cr residual blocks of a CU into one or more luma, Cb, and Cr transform blocks. A transform block is a rectangular (e.g., square or non-square) block of samples on which the same transform is applied. A transform unit (TU) of a CU may comprise a transform block of luma samples, two corresponding transform blocks of chroma samples, and syntax structures used to transform the transform block samples. Thus, each TU of a CU may be associated with a luma transform block, a Cb transform block, and a Cr transform block. The luma transform block associated with the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may comprise a single transform block and syntax structures used to transform the samples of the transform block.

Video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. After video encoder 20 quantizes a coefficient block, video encoder 20 may entropy encode syntax elements indicating the quantized transform coefficients. For example, video encoder 20 may perform Context-Adaptive Binary Arithmetic Coding (CABAC) on the syntax elements indicating the quantized transform coefficients.

Video encoder 20 may output a bitstream that includes a sequence of bits that forms a representation of coded pictures and associated data. The bitstream may comprise a sequence of Network Abstraction Layer (NAL) units. A NAL unit is a syntax structure containing an indication of the type of data in the NAL unit and bytes containing that data in the form of a raw byte sequence payload (RB SP) interspersed as necessary with emulation prevention bits. Each of the NAL units includes a NAL unit header and encapsulates a RBSP. The NAL unit header may include a syntax element that indicates a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RB SP includes zero bits.

Different types of NAL units may encapsulate different types of RBSPs. For example, a first type of NAL unit may encapsulate an RBSP for a PPS, a second type of NAL unit may encapsulate an RBSP for a coded slice, a third type of NAL unit may encapsulate an RBSP for SEI messages, and so on. NAL units that encapsulate RBSPs for video coding data (as opposed to RBSPs for parameter sets and SEI messages) may be referred to as VCL NAL units.

Video decoder 30 may receive a bitstream generated by video encoder 20. In addition, video decoder 30 may parse the bitstream to obtain syntax elements from the bitstream. Video decoder 30 may reconstruct the pictures of the video data based at least in part on the syntax elements obtained from the bitstream. The process to reconstruct the video data may be generally reciprocal to the process performed by video encoder 20. In addition, video decoder 30 may inverse quantize coefficient blocks associated with TUs of a current CU. Video decoder 30 may perform inverse transforms on the coefficient blocks to reconstruct transform blocks associated with the TUs of the current CU. Video decoder 30 may reconstruct the coding blocks of the current CU by adding the samples of the predictive blocks for PUs of the current CU to corresponding samples of the transform blocks of the TUs of the current CU. By reconstructing the coding blocks for each CU of a picture, video decoder 30 may reconstruct the picture.

In HEVC, the largest coding unit in a slice is called a coding tree block (CTB) or coding tree unit (CTU). A CTB contains a quad-tree, the nodes of which are coding units. The size of a CTB can range from 16×16 to 64×64 in the HEVC main profile (although technically 8×8 CTB sizes can be supported). A CU may be as large as a CTB or as small as 8×8 or a size in between the two. Each CU is typically coded using one coding mode. When a CU is inter coded, the inter coded CU may be further partitioned into 2 or 4 PUs or have just one PU when further partitioning does not apply. When two PUs are present in one CU, the two PUs can be half size rectangles or two rectangle size with ¼ or ¾ size of the CU. When the CU is inter coded, one set of motion information is present for each PU. In addition, each PU is coded with a unique inter-prediction mode to derive the set of motion information.

In order to reduce the bit rate needed to transmit motion information (e.g., motion vectors, reference indexes, and/or motion vector precision), video coding standards typically use different types of motion vector prediction. In the HEVC standard, for example, there are two inter prediction modes, named merge mode (with skip mode being considered a special case of merge mode) and advanced motion vector prediction (AMVP) mode respectively for a PU.

In either AMVP or merge mode, video decoder 30 maintains a motion vector (MV) candidate list for multiple motion vector predictors. Video decoder 30 generates the motion vector(s), as well as reference indices in the merge mode, of the current PU by taking one candidate from the MV candidate list. Both video encoder 20 and video decoder 30 generate the same candidate lists. This disclosure will describe motion vector prediction from the perspective of video decoder 30, but it should be understood that video encoder 20 generally implements the same techniques.

In the base HEVC standard, the MV candidate list contains up to five candidates for the merge mode and only two candidates for the AMVP mode, although other standards may use different numbers of candidates. A merge candidate may contain a set of motion information, e.g., motion vectors corresponding to one or both reference picture lists (list 0 and list 1) and the reference indices. If a merge candidate is identified by a merge index, then video decoder 30 uses the motion vectors and reference picture indices of the identified merge candidate for the prediction of the current block. However, under AMVP mode for each potential prediction direction from either list 0 or list 1, a reference index needs to be explicitly signaled, together with an MV predictor (MVP) index to the MV candidate list since the AMVP candidate contains only a motion vector. In AMVP mode, the predicted motion vectors can be further refined.

As can be seen above, a merge candidate corresponds to a full set of motion information while an AMVP candidate contains just one motion vector for a specific prediction direction and for a reference index. The candidates for both modes may be derived similarly from the same spatial and temporal neighboring blocks.

Figure 2A:
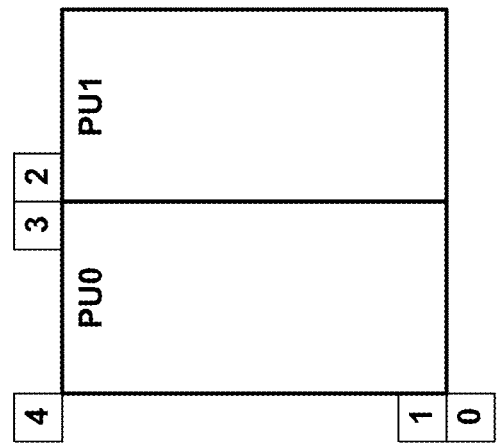
FIG. 2A is a conceptual diagram showing an example of spatial neighboring motion vector candidates for merge mode.

FIG. 2A is a conceptual diagram showing an example of spatial neighboring motion vector candidates for merge mode. Video decoder 30 may generate a candidate list by adding the motion information of spatial neighboring candidates to the candidate list. Spatial MV candidates are derived from the neighboring blocks shown in FIGS. 2A and 2B, for a specific PU ($PU_0$), although the methods generating the candidates from the blocks differ for merge and AMVP modes. In merge mode, up to four spatial MV candidates can be derived with the orders shown in FIG. 2A with numbers, and the order is the following: left (0, A1), above (1, B1), above right (2, B0), below left (3, A0), and above left (4, B2), as shown in FIG. 2A.

Figure 2B:
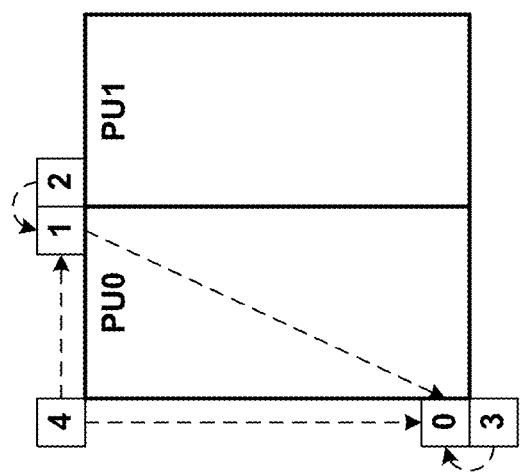
FIG. 2B is a conceptual diagram showing an example of spatial neighboring motion vector candidates for an advanced motion vector prediction mode.

FIG. 2B is a conceptual diagram showing an example of spatial neighboring motion vector candidates for an advanced motion vector prediction mode. In AVMP mode, the neighboring blocks are divided into two groups: left group consisting of the block 0 and 1, and above group consisting of the blocks 2, 3, and 4 as shown in FIG. 2B. For each group, the potential candidate in a neighboring block referring to the same reference picture as that indicated by the signaled reference index has the highest priority to be chosen to form a final candidate of the group. It is possible that all neighboring blocks do not contain a motion vector pointing to the same reference picture. Therefore, if such a candidate cannot be found, then video decoder 30 may scale the first available candidate to form the final candidate, thus the temporal distance differences can be compensated.

Video encoder 20 and video decoder 30 may perform temporal motion vector prediction (TMVP) as in the HEVC standard. Video decoder 30 may add a TMVP candidate, if enabled and available, into the MV candidate list after spatial motion vector candidates. The process of motion vector derivation for TMVP candidate is the same for both merge and AMVP modes; however, in HEVC, the target reference index for the TMVP candidate in the merge mode is always set to 0.

Figure 3B:
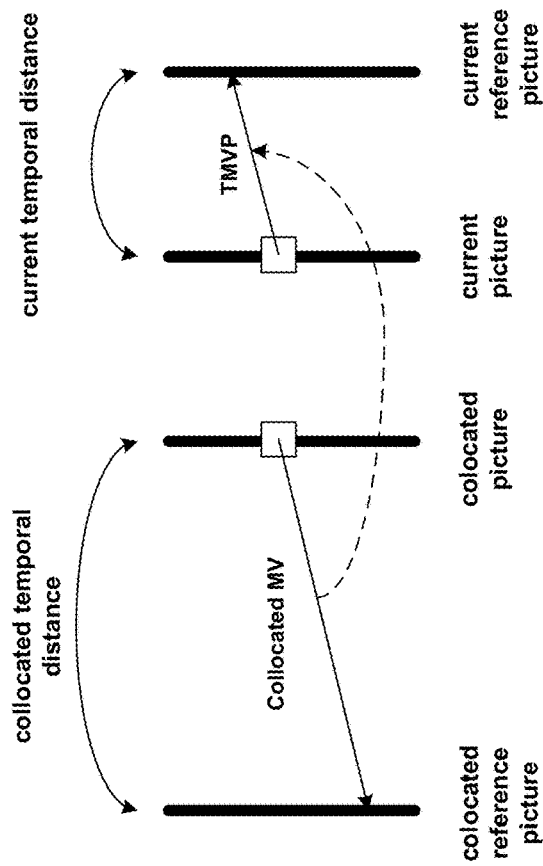
FIG. 3B is a conceptual timing diagram showing an example of motion vector scaling.
Figure 3A:
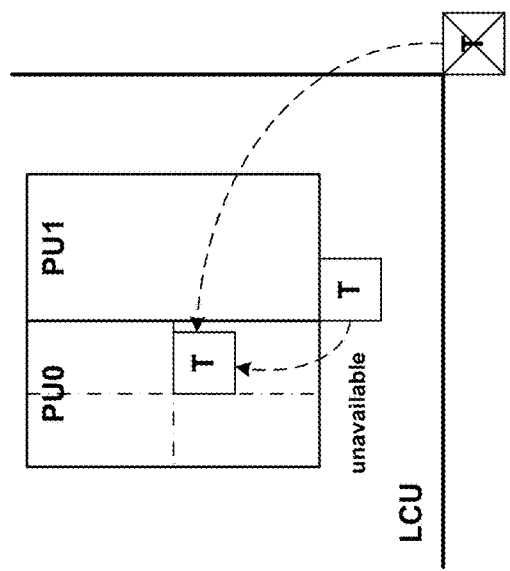
FIG. 3A is a conceptual diagram showing an example of a temporal motion vector predictor candidate.

FIG. 3A is a conceptual diagram showing an example of a temporal motion vector predictor candidate. The primary block location for TMVP candidate derivation is the bottom right block outside of the collocated PU as shown in FIG. 3A as a block "T", to compensate the bias to the above and left blocks used to generate spatial neighboring candidates. However, if that block is located outside of the current CTB row or motion information is not available, the block is substituted with a center block of the PU.

Video decoder 30 may derive a motion vector for the TMVP candidate from the co-located PU of the co-located picture, indicated in the slice level. The motion vector for the co-located PU is called collocated MV. A block in a reference picture may, for example, be considered to be co-located to a block in a current picture if the block in the reference picture and the current block each include at least one pixel corresponding to a same relative position in the reference picture and the current picture.

FIG. 3B is a conceptual timing diagram showing an example of motion vector scaling. Similar to temporal direct mode in AVC, to derive the TMVP candidate motion vector, video decoder 30 may scale the co-located MV to compensate for the temporal distance differences, as shown in FIG. 3B. With motion vector scaling, it is generally assumed that the value of motion vectors is proportional to the distance of pictures in the presentation time. A motion vector associates two pictures, the reference picture, and the picture containing the motion vector (namely the containing picture). When a motion vector is utilized to predict the other motion vector, the distance of the containing picture and the reference picture is calculated based on the Picture Order Count (POC) values.

When a motion vector is being predicted, its reference picture and the reference picture of the motion vector predictor may be different. Therefore, a new distance (based on POC) is calculated. And the motion vector is scaled based on these two POC distances. In HEVC, motion vector scaling applies to both TMVP and AMVP for spatial and temporal neighboring candidates.

With respect to artificial motion vector candidate generation, if a motion vector candidate list is not complete, then video decoder 30 may generate artificial motion vector candidates insert that artificial motion vector candidates at the end of the list until the list is full or until options for artificial candidates are exhausted.

In merge mode, there are two types of artificial MV candidates: combined candidate derived only for B-slices and zero candidates used only if the first type does not provide enough artificial candidates.

For each pair of candidates that are already in the candidate list and have necessary motion information, video decoder 30 may derive bi-directional combined motion vector candidates by a combination of the motion vector of the first candidate referring to a picture in the list 0 and the motion vector of a second candidate referring to a picture in the list 1.

With respect to the pruning process for candidate insertion, candidates from different blocks may happen to be the same, which decreases the efficiency of a merge/AMVP candidate list due to candidate duplication in the list. To help reduce this inefficiency, video decoder 30 may apply a pruning process. As part of the pruning process, video decoder 30 compares one candidate against the others in the current candidate list to avoid inserting identical candidate in certain extent. To reduce the complexity, only a limited number of pruning processes may be applied instead of comparing each potential candidates with all the other existing candidates.

The JEM reference software includes several inter coding tools that utilize DMVD to derive or refine the motion vector for a current block. One such DMVD tool is pattern matched motion vector derivation (PMMVD) mode, which is a special merge mode based on Frame-Rate Up Conversion (FRUC) techniques. When implementing the JEM reference software, in PMMVD mode, video decoder 30 may derive motion information for a block rather than receive explicit signaling.

Video decoder 30 may receive A FRUC flag for a CU when a merge flag for the CU is true. When the FRUC flag is false, then video decoder 30 may receive a merge index and use the regular merge mode. When the FRUC flag is true, video decoder 30 may receive an additional FRUC mode flag to indicate which method (e.g., bilateral matching or template matching) is to be used to derive motion information for the block. The syntax table to code flags for FRUC is as follows:

| | |
|---|---|
| fruc_flag | u(1) |
| if(fruc_flag){ | |
|     if(slice_type != P_slice){ | |
|         fruc_mode | u(1) |
|     } | |
| } | |

During the motion derivation process, video decoder 30 may first derive an initial motion vector for the whole CU based on bilateral matching or template matching. First, the merge list of the CU, or called PMMVD seeds, is checked and the candidate which leads to the minimum matching cost is selected as the starting point. Then a local search based on bilateral matching or template matching around the starting point is performed and the MV results in the minimum matching cost is taken as the MV for the whole CU. Subsequently, the motion information is further refined at sub-block level with the derived CU motion vectors as the starting points.

Figure 4:
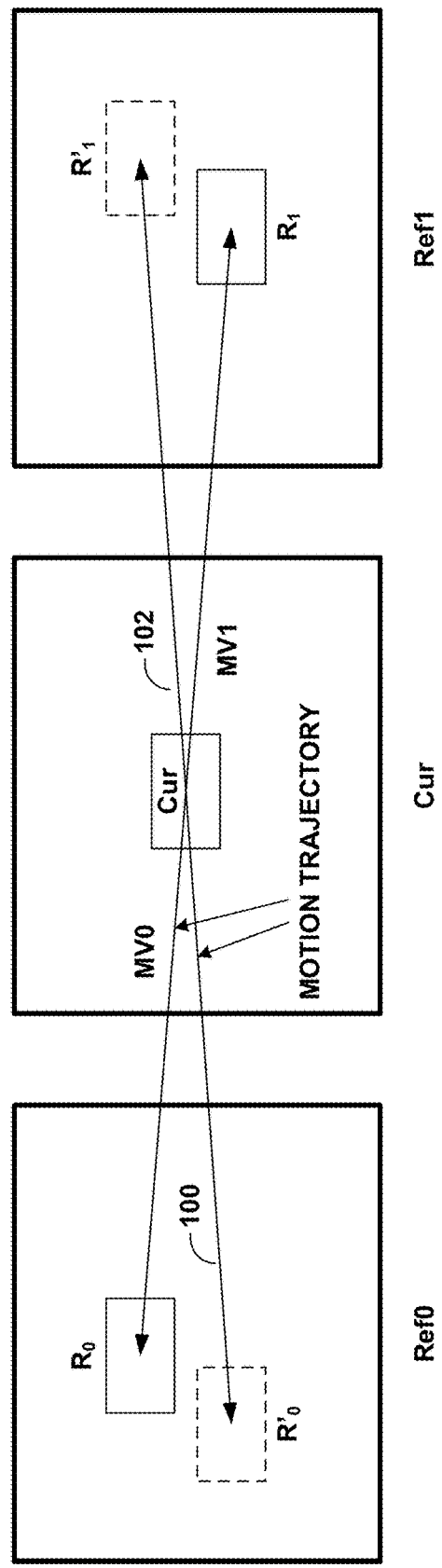
FIG. 4 is a conceptual diagram showing an example of bilateral matching.

FIG. 4 is a conceptual diagram showing an example of bilateral matching. As shown in the FIG. 4, bilateral matching is used to derive motion information of the current block (Cur) by finding the best match between two reference blocks ($R_0$ and $R_1$) along the motion trajectory of the current block in two different reference pictures (Ref0 and Ref1). The motion trajectory may include the path that a pixel in a block follows through space and time when considering an image sequence (e.g., reference frames and the current frame) as a 3-dimensional continuous spatio-temporal field. Under the assumption of continuous motion trajectory, the motion vectors MV0 and MV1 pointing to the two reference blocks ($R_0$ and $R_1$) are proportional to the temporal distances between the current picture (Cur) and the two reference pictures (Ref0 and Ref1). Derived MVs 100 and 102 are derived using bilateral matching and point to reference blocks $R'_0$ and $R'_1$ respectively. As a special case, when the current picture (Cur) is temporally between the two reference pictures (Ref0 and Ref1) and the temporal distance from the current picture to the two reference pictures is the same, the bilateral matching becomes mirror based bi-directional MV. Consequentially, derived motion vectors 100 and 102 similarly are mirrored.

Figure 5:
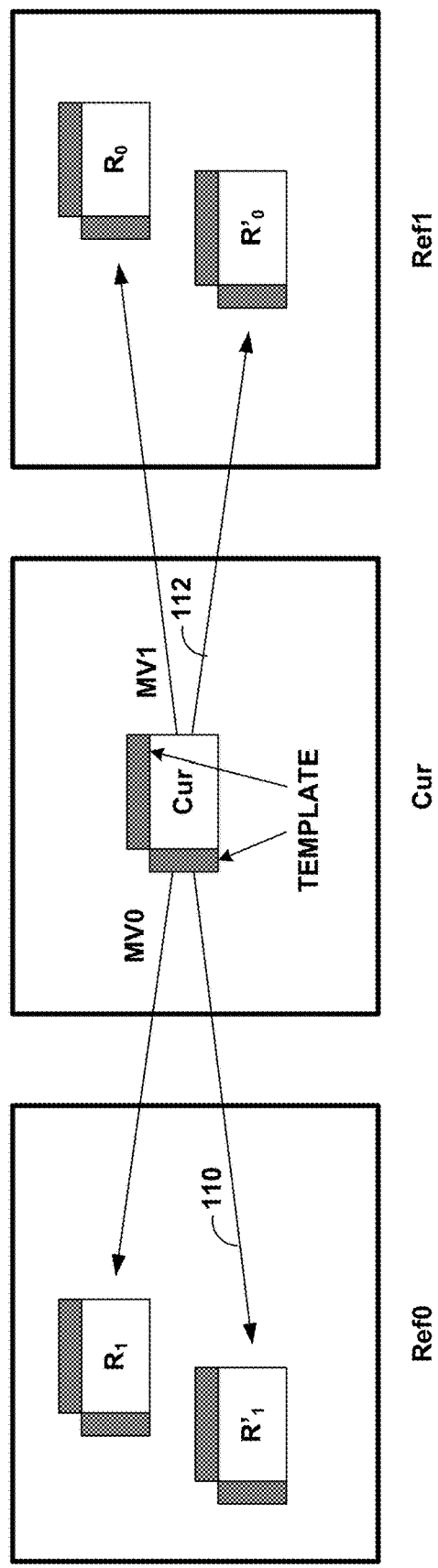
FIG. 5 is a conceptual diagram showing an example of template matching.

FIG. 5 is a conceptual diagram showing an example of template matching. As shown in FIG. 5, template matching is used to derive motion information of the current block (Cur) by finding the best match between a template (top and/or left neighboring blocks of the current block) in the current picture and a block (same size to the template) in a reference picture (Ref0 and Ref1). A template may include neighboring pixels of a block that is used to compare a block of interest (Cur) with candidate references ($R_0$ with MV0 and $R_1$ with MV1) or derived references ($R'_0$ with MV 110 and R'₁ with MV 112) by searching neighboring blocks of R₀ and R₁. The most similar reference is then used as the prediction.

At video encoder 20, the decision on whether using FRUC merge mode for a CU is based on RD cost selection as done for normal merge candidate. That is the two matching modes (bilateral matching and template matching) are both checked for a CU by using RD cost selection. The one leading to the minimal cost is further compared to other CU modes. If a FRUC matching mode is the most efficient one, FRUC flag is set to true for the CU and the related matching mode is used.

Figure 6A:
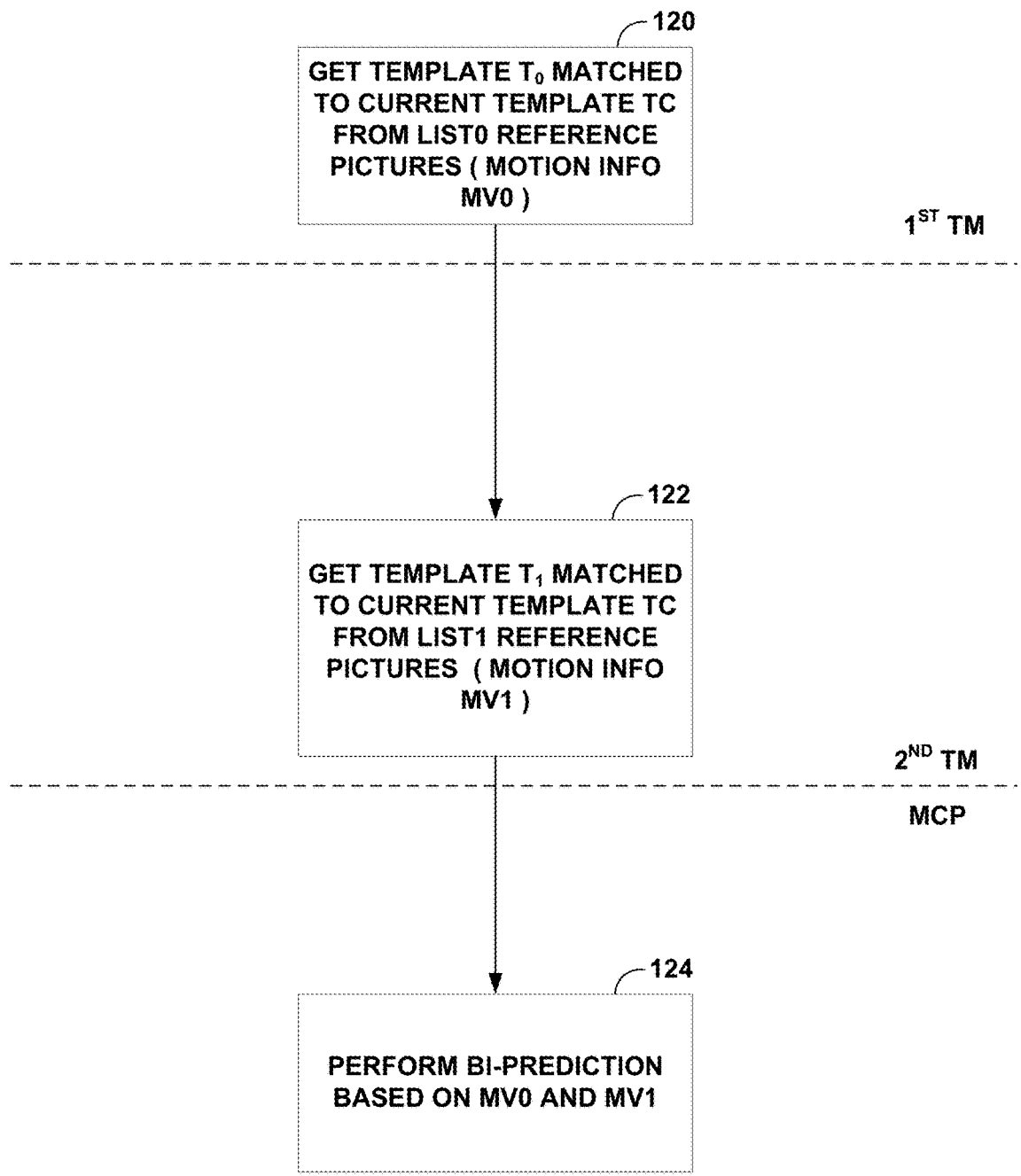
FIGS. 6A and 6B are flow diagrams showing example proposed modifications to frame-rate up conversion template matching mode.

In the 5th WET meeting, "Enhanced Template Matching in FRUC Mode," WET-E0035, available at http://phenix.it-sudparis.eu/jvet/, was proposed to further improve FRUC Template matching. A flowchart of an exemplary FRUC template matching mode is shown in FIG. 6A. In the first step, a template $T_0$ (and its corresponding motion information MV0) is found to match current template Tc of current block from list0 reference pictures. In the second step, template $T_1$ (and its corresponding motion information MV1) is found from list1 reference pictures. The obtained motion information MV0 and MV1 are used to perform bi-prediction to generate predictor of the current block.

Figure 6B:
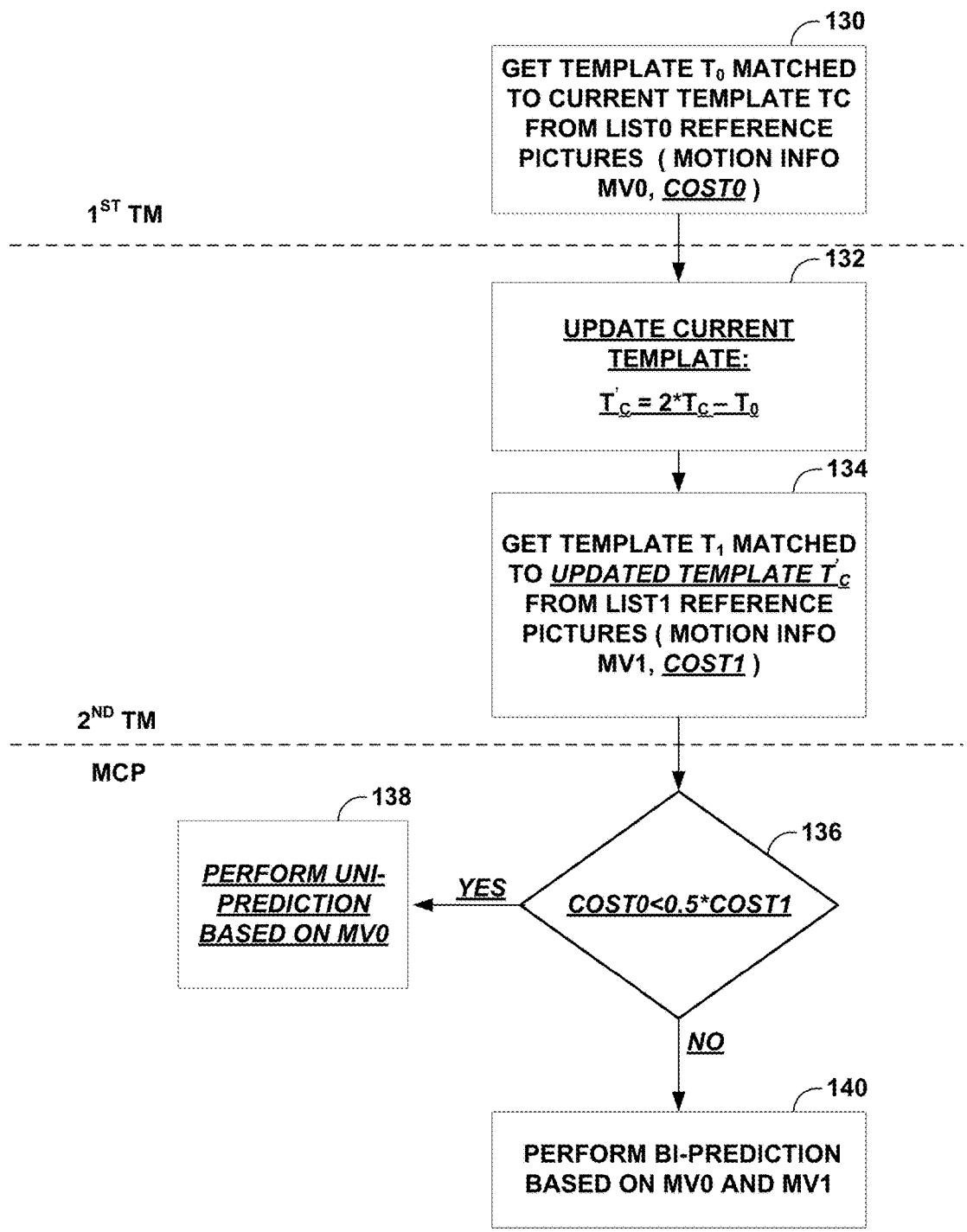

FIGS. 6A and 6B are flow diagrams showing example proposed modifications to frame-rate up conversion template matching mode. FRUC template matching mode may be enhanced by introducing bi-directional template matching and adaptive selection between uni-prediction and bi-prediction. Exemplary modifications relative to FIG. 6A are underlined in FIG. 6B.

Bi-directional template matching may be implemented based on uni-directional template matching. As shown in FIG. 6A, a matched template $T_0$ is first found in the first step of template matching from List0 reference pictures (120). Note that List0 here is only taken as an example. In fact, whether List0 or List1 used in the first step is adaptive to initial distortion cost between current template and initial template in corresponding reference picture. The initial template can be determined with initial motion information of the current block which is available before performing the first template matching. The reference picture list corresponding to minimal initial template distortion cost will be used in the first step of template matching. For example, if initial template distortion cost corresponding to list0 is no larger than cost corresponding to List1, List0 is used in the first step of template matching and List1 is used in the second step), then, the current template $T_C$ of current block is updated as follows:

$$T'_C = 2*T_C - T_0$$

The updated current template T'$_C$, instead of the current template $T_C$, is used to find another matched template $T_1$ from List1 reference pictures in the second template matching (122). As a result, the matched template $T_1$ is found by jointly using List0 and List1 reference pictures (124). This matching process is called bi-directional template matching.

The selection between uni-prediction and bi-prediction for motion compensation prediction (MCP) may be based on template matching distortion. As shown in FIG. 6B, during template matching, distortion between template $T_0$ and Tc (the current template) can be calculated as cost0 (130), the current template may be updated (132), and distortion between template $T_1$ and T'$_C$ (the updated current template) can be calculated as cost1 (134). If cost0 is less than 0.5*cost1 (136), uni-prediction based on MV0 may be applied to FRUC template matching mode (138); otherwise, bi-prediction based on MV0 and MV1 is applied (140). Note that cost0 is compared to 0.5*cost1 since cost1 indicates a difference between template $T_1$ and T'$_C$ (the updated current template), which is 2 times of difference between $T_C$ (the current template) and its prediction of 0.5*($T_0$+$T_1$). It is noted that MCP may be applied to PU-level motion refinement. Sub-PU level motion refinement may be kept unchanged.

Figure 7:
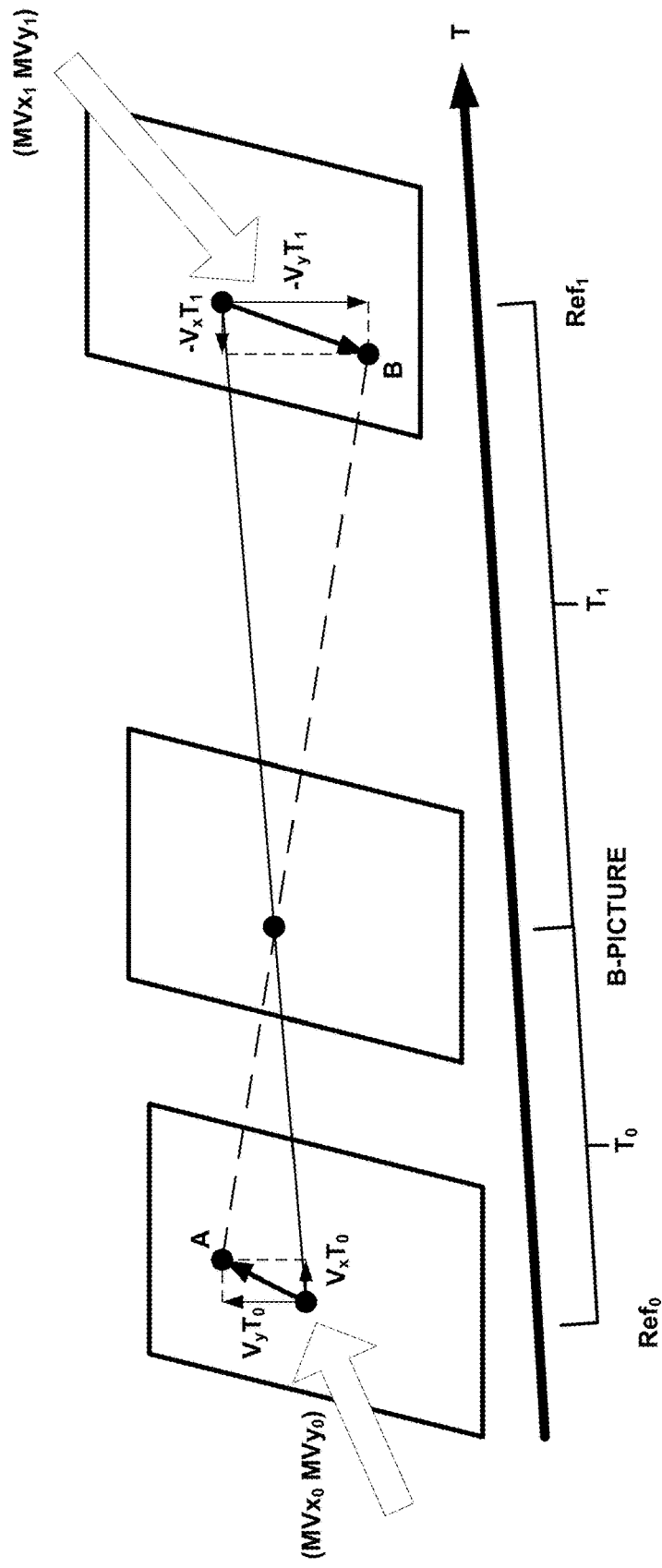
FIG. 7 is a conceptual diagram showing an example of optical flow trajectory.

FIG. 7 is a conceptual diagram showing an example of optical flow trajectory. JEM also include a coding mode referred to as Bi-directional optical flow (BIO). BIO is pixel-wise motion refinement which is performed on top of block-wise motion compensation in a case of bi-prediction. As BIO compensates the fine motion can inside the block enabling BIO results in enlarging block size for motion compensation. Sample-level motion refinement may not require exhaustive search or signaling as an explicit equation can gives fine motion vector for each sample.

Let $I^{(k)}$ be luminance value from reference k (k=0, 1) after compensation block motion, and $\partial I^{(k)}/\partial x$, $\partial I^{(k)}/\partial y$ are horizontal and vertical components of the $I^{(k)}$ gradient respectively. Assuming the optical flow is valid, the motion vector field ($v_x$,$v_y$) is given by an equation $$\partial I^{(k)}/\partial t + v_x \partial I^{(k)}/\partial x + v_y \partial I^{(k)}/\partial y = 0. \quad (1)$$

Combining optical flow equation with Hermite interpolation for motion trajectory of each sample one gets a unique polynomial of third order which matches both function values $I^{(k)}$ and derivatives $\partial I^{(k)}/\partial x$, $\partial I^{(k)}/\partial y$ at the ends. The value of this polynomial at t=0 is BIO prediction:

$$\text{pred}_{BIO}=1/2 \cdot (I^{(0)}+I^{(1)}+v_x/2 \cdot (\tau_1 \partial I^{(1)}/\partial x - \tau_0 \partial I^{(0)}/\partial x)+v_y/2 \cdot (\tau_1 \partial I^{(1)}/\partial y - \tau_0 \partial I^{(k)}/\partial y)). \quad (2)$$

Here $\tau_0$ and $\tau_1$ denote the distance to reference frames as shown in FIG. 7. Distances $\tau_0$ and $\tau_1$ are calculated based on POC for Ref0 and Ref1: $\tau_0$=POC(current)−POC(Ref0), $\tau_1$=POC(Ref1)−POC(current). If both predictions come from the same time direction (both from the past or both from the future) then signs are different $\tau_0 \cdot \tau_1 < 0$. In this case BIO is applied only if prediction come not from the same time moment ($\tau_0 \neq \tau_1$), both referenced regions have non-zero motion (MVx$_0$, MVy$_0$, MVx$_1$, MVy$_1 \neq 0$) and block motion vectors are proportional to the time distance (MVx$_0$/MVx$_1$=MVy$_0$/MVy$_1$=−$\tau_0$/$\tau_1$).

The motion vector field ($v_x$,$v_y$) is determined by minimizing the difference $\Delta$ between values in points A and B (intersection of motion trajectory and reference frame planes in FIG. 7). Model uses only first linear term of local Taylor expansion for $\Delta$:

$$\Delta = (I^{(0)}-I^{(1)}+v_x(\tau_1 \partial I^{(1)}/\partial x + \tau_0 \partial I^{(0)}/\partial x)+v_y(\tau_1 \partial I^{(1)}/\partial y + \tau_0 \partial I^{(1)}/\partial y)) \quad (3)$$

All values in (1) depend on sample location (i', j'), which was omitted so far. Assuming the motion is consistent in local surrounding, then $\Delta$ inside (2M+1)×(2M+1) square window $\Omega$ centered in currently predicted point (i,j) is minimized:

$$(v_x, v_y) = \underset{v_x,v_y}{\operatorname{argmin}} \sum_{[i',j']\in\Omega} \Delta^2[i', j'] \quad (4)$$

For this optimization problem, a simplified solution making first minimization in vertical and then in horizontal directions may be used. It results in $$v_x = (s_1 + r) > m ? \text{ clip3}\left(1 - thBIO, theBIO, -\frac{s_3}{(s_1+r)}\right) : 0 \quad (5)$$

$$v_y = (s_5 + r) > m ? \text{ clip3}\left(-thBIO, theBIO, -\frac{s_6 - v_x s_2/2}{(s_5+r)}\right) : 0 \quad (6)$$

where $$s_1 = \sum_{[i',j] \in \Omega} (\tau_1 \partial I^{(1)}/\partial x + \tau_0 \partial I^{(0)}/\partial x)^2; \quad (7)$$

$$s_3 = \sum_{[i',j] \in \Omega} (I^{(1)} - I^{(0)})(\tau_1 \partial I^{(1)}/\partial x + \tau_0 \partial I^{(0)}/\partial x);$$

$$s_2 = \sum_{[i',j] \in \Omega} (\tau_1 \partial I^{(1)}/\partial x + \tau_0 \partial I^{(0)}/\partial x)(\tau_1 \partial I^{(1)}/\partial y + \tau_0 \partial I^{(0)}/\partial y);$$

$$s_5 = \sum_{[i',j] \in \Omega} (\tau_1 \partial I^{(1)}/\partial y + \tau_0 \partial I^{(0)}/\partial y)^2;$$

$$s_6 = \sum_{[i',j] \in \Omega} (I^{(1)} - I^{(0)})(\tau_1 \partial I^{(1)}/\partial y + \tau_0 \partial I^{(0)}/\partial y)$$

In order to avoid division by zero or very small value, regularization parameters r and m are introduced in equations (2), (3).

$$r = 500 \cdot 4^{d-8} \quad (8)$$

$$m = 700 \cdot 4^{d-8} \quad (9)$$

Here d is internal bit-depth of the input video.

In some cases, MV regiment of BIO might be unreliable due to noise or irregular motion. Therefore, in BIO, the magnitude of MV regiment is clipped to the certain threshold thBIO. The threshold value is determined based on whether all the reference pictures of the current picture are all from one direction. If all the reference pictures of the current pictures of the current picture are from one direction, the value of the threshold is set to $12 \times 2^{14-d}$, otherwise, it is set to $12 \times 2^{13-d}$.

Gradients for BIO are calculated at the same time with motion compensation interpolation using operations consistent with HEVC motion compensation process (2D separable FIR). The input for this 2D separable FIR is the same reference frame sample as for motion compensation process and fractional position (fracX, fracY) according to the fractional part of block motion vector. In case of horizontal gradient $\partial I/\partial x$ signal first interpolated vertically using BIOfilterS corresponding to the fractional position fracY with de-scaling shift d−8, then gradient filter BIOfilterG is applied in horizontal direction corresponding to the fractional position fracX with de-scaling shift by 18−d. In case of vertical gradient $\partial I/\partial y$ first gradient filter is applied vertically using BIOfilterG corresponding to the fractional position fracY with de-scaling shift d−8, then signal displacement is performed using BIOfilterS in horizontal direction corresponding to the fractional position fracX with de-scaling shift by 18−d. The length of interpolation filter for gradients calculation BIOfilterG and signal displacement BIOfilterF is shorter (6-tap) in order to maintain reasonable complexity. Table 1 shows the filters used for gradients calculation for different fractional positions of block motion vector in BIO. Table 2 shows the interpolation filters used for prediction signal generation in BIO.

Figure 8:
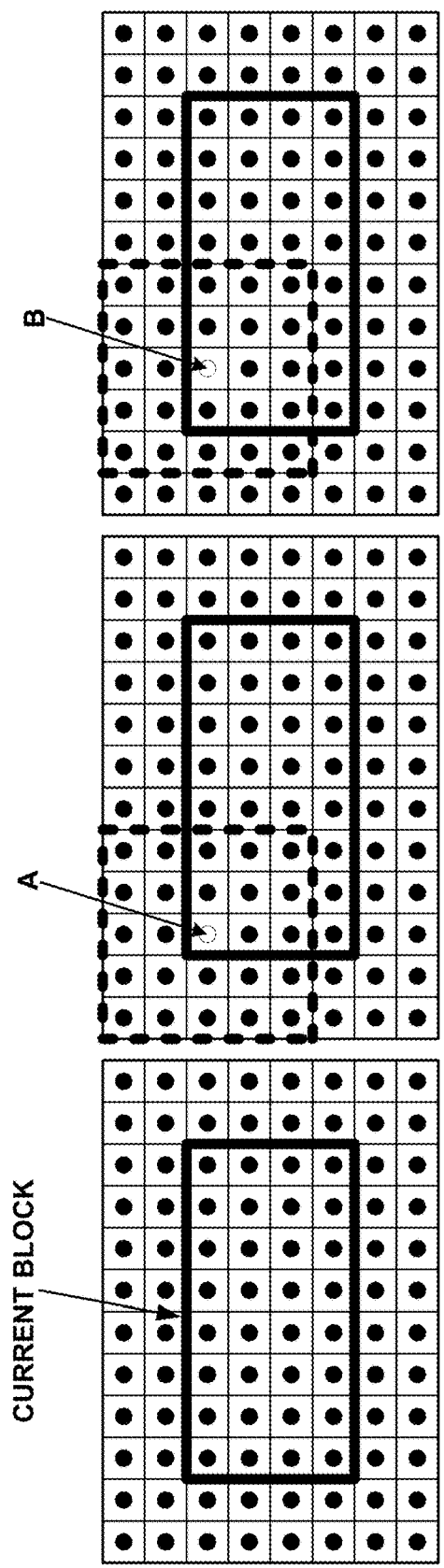
FIG. 8 is a conceptual diagram showing an example of bi-directional optical flow for an 8×4 block.

FIG. 8 is a conceptual diagram showing an example of bi-directional optical flow for an 8×4 block. FIG. 8 shows an example of a technique for performing a gradient calculation for the 8×4 block. For an 8×4 blocks, video decoder 30 needs to fetch the motion compensated predictors and calculate the HOR/VER gradients of all the pixels within current block as well as the outer two lines of pixels because solving vx and vy for each pixel needs the HOR/VER gradient values and motion compensated predictors of the pixels within the window Ω centered in each pixel as shown in equation (4). And in JEM, the size of this window is set to 5×5, it therefore needs to fetch the motion compensated predictors and calculate the gradients for the outer two lines of pixels.

TABLE 1

Filters for gradients calculation in BIO

| Fractional pel position | Interpolation filter for gradient(BIOfilterG) |
|---|---|
| 0 | {8, −39, −3, 46, −17, 5} |
| 1/16 | {8, −32, −13, 50, −18, 5} |
| 1/8 | {7, −27, −20, 54, −19, 5} |
| 3/16 | {6, −21, −29, 57, −18, 5} |
| 1/4 | {4, −17, −36, 60, −15, 4} |
| 5/16 | {3, −9, −44, 61, −15, 4} |
| 3/8 | {1, −4, −48, 61, −13, 3} |
| 7/16 | {0, 1, −54, 60, −9, 2} |
| 1/2 | {1, 4, −57, 57, −4, 1} |

TABLE 2

Interpolation filters for prediction signal generation in BIO

| Fractional pel position | Interpolation filter for prediction signal(BIOfilterS) |
|---|---|
| 0 | {0, 0, 64, 0, 0, 0} |
| 1/16 | {1, −3, 64, 4, −2, 0} |
| 1/8 | {1, −6, 62, 9, −3, 1} |
| 3/16 | {2, −8, 60, 14, −5, 1} |
| 1/4 | {2, −9, 57, 19, −7, 2} |
| 5/16 | {3, −10, 53, 24, −8, 2} |
| 3/8 | {3, −11, 50, 29, −9, 2} |
| 7/16 | {3, −11, 44, 35, −10, 3} |
| 1/2 | {1, −7, 38, 38, −7, 1} |

In JEM, BIO is applied to all bi-directional predicted blocks when the two predictions are from different reference pictures. When LIC is enabled for a CU, BIO is disabled.

Figure 9:
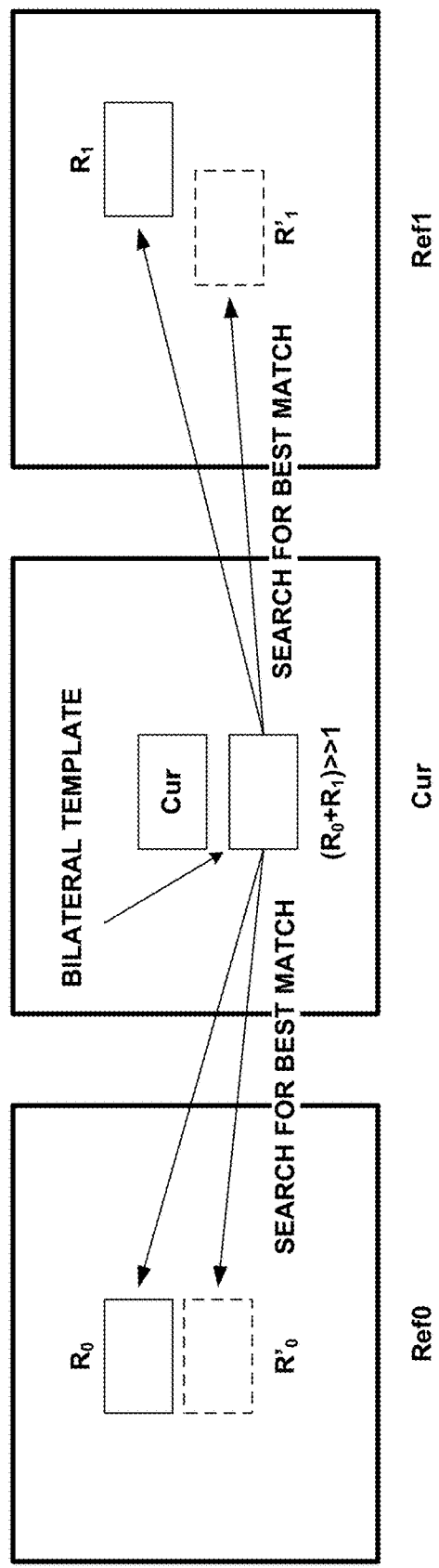
FIG. 9 is a conceptual diagram showing an example of proposed decoder-side motion vector derivation based on bilateral template matching.

FIG. 9 is a conceptual diagram showing an example of proposed decoder-side motion vector derivation based on bilateral template matching. JEM also includes a coding tool referred to as template matching. Video decoder 30 generates a bilateral template as the weighted combination of the two prediction blocks, from the initial MV0 of list0 and MV1 of list1 respectively, as shown in FIG. 9.

The template matching operation consists of calculating cost measures between the generated template and the sample region (around the initial prediction block) in the reference picture. For each of the two reference pictures, the MV that yields the minimum template cost is considered as the updated MV of that list to replace the original one. Finally, the two new MVs, i.e., MV0' and MV1' as shown in FIG. 8, are used for regular bi-prediction. As it is commonly used in block-matching motion estimation, the sum of absolute differences (SAD) is utilized as cost measure.

The proposed DMVD techniques are applied for merge mode of bi-prediction with one from the reference picture in the past and the other from reference picture in the future, without the transmission of additional syntax element.

Figure 10B:
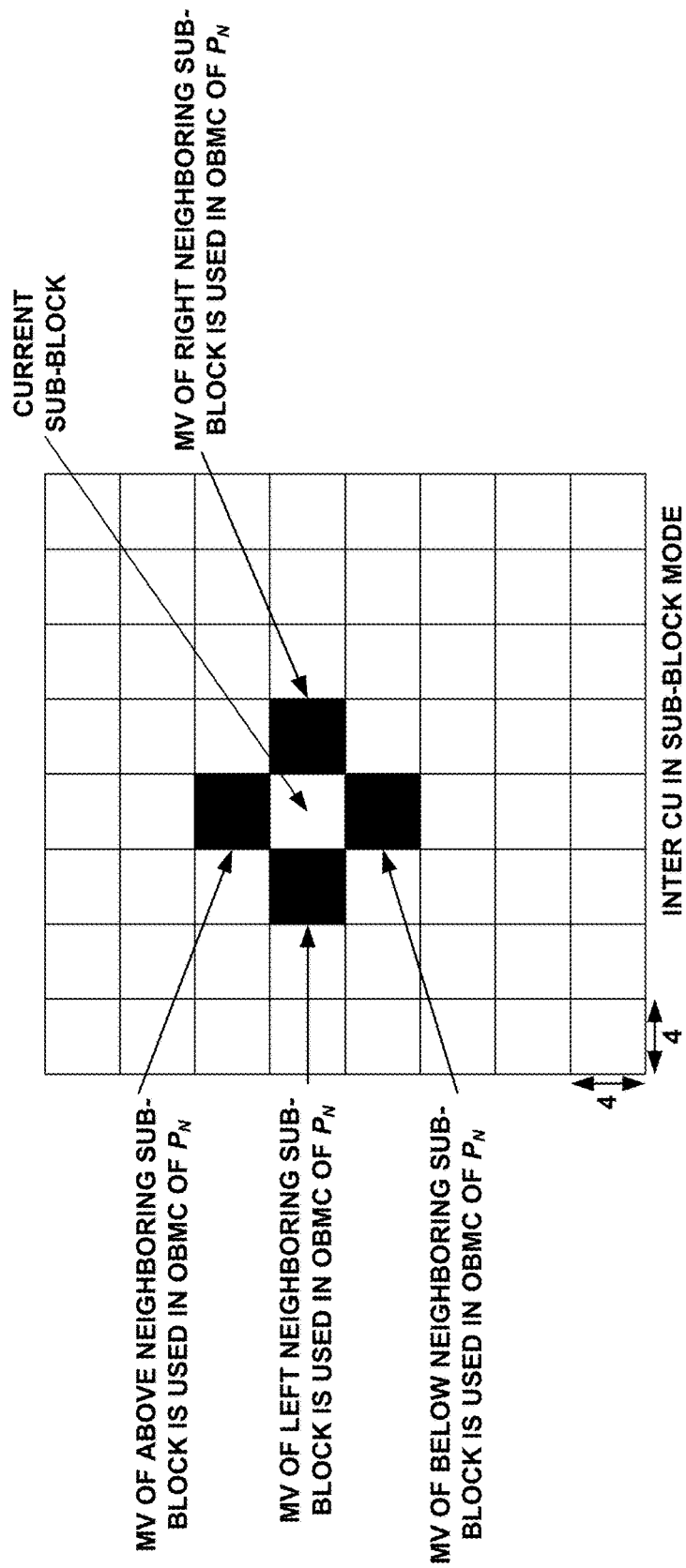
Figure 11A:
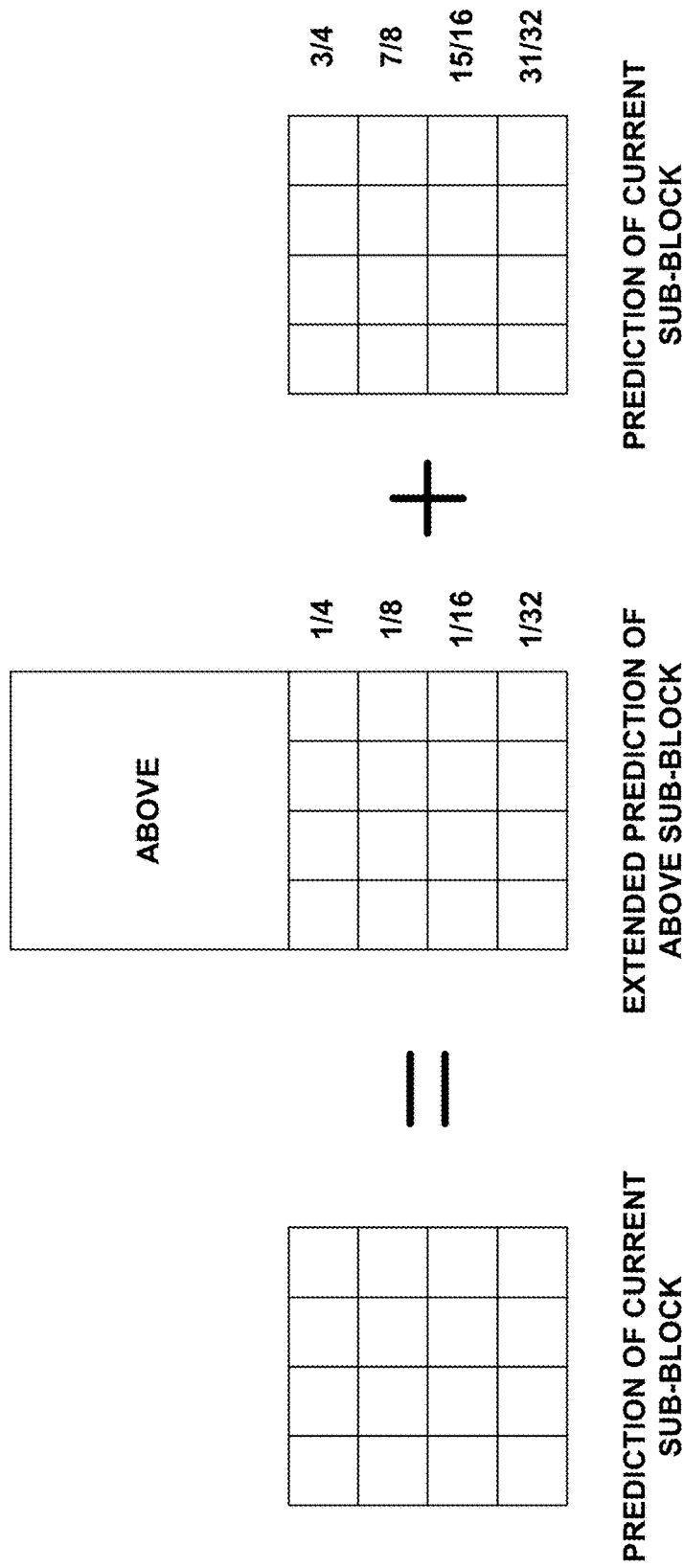
FIGS. 11A-11D are conceptual diagrams showing examples of overlapped block motion compensation weightings.
Figure 11B:
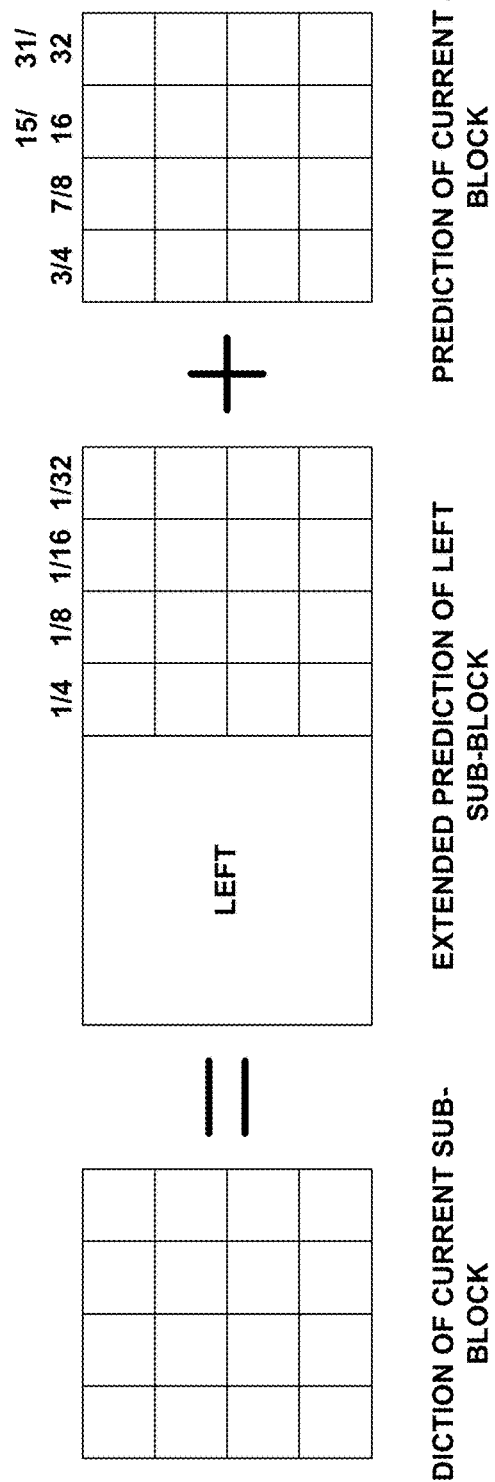
Figure 11C:
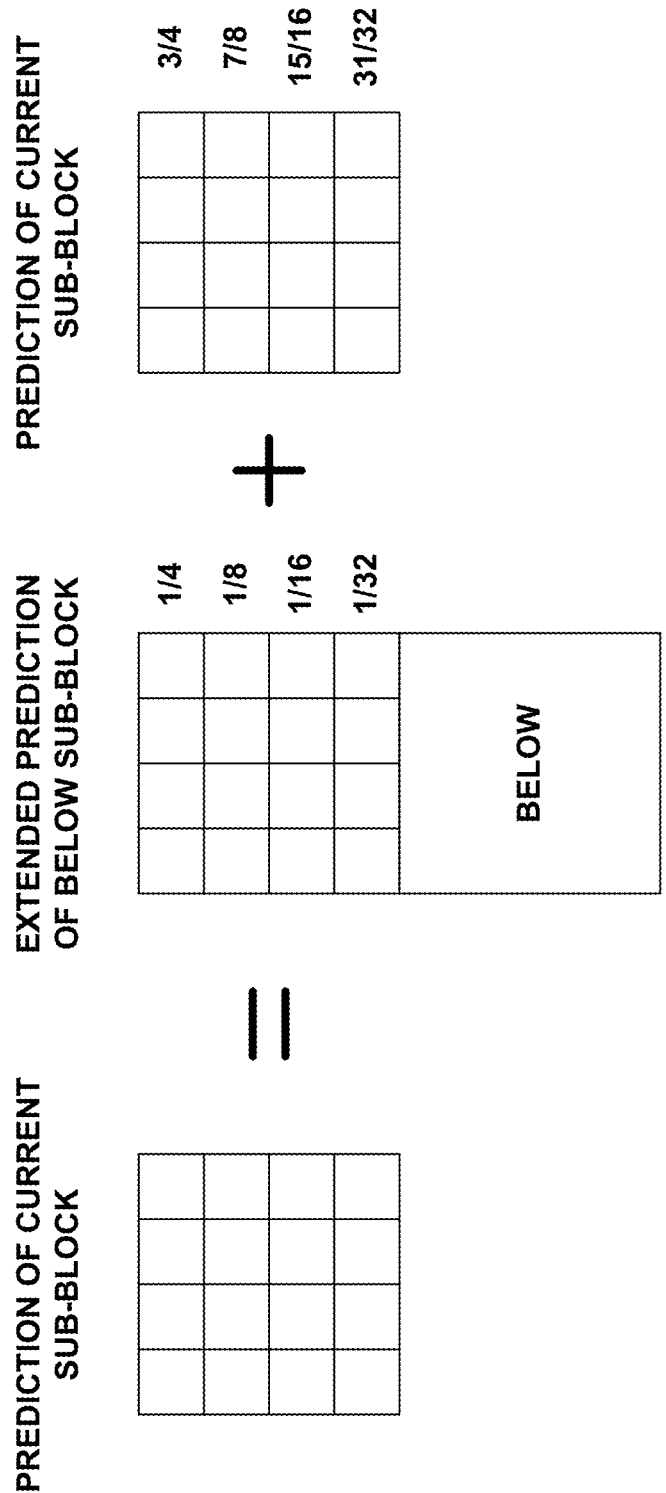
Figure 11D:
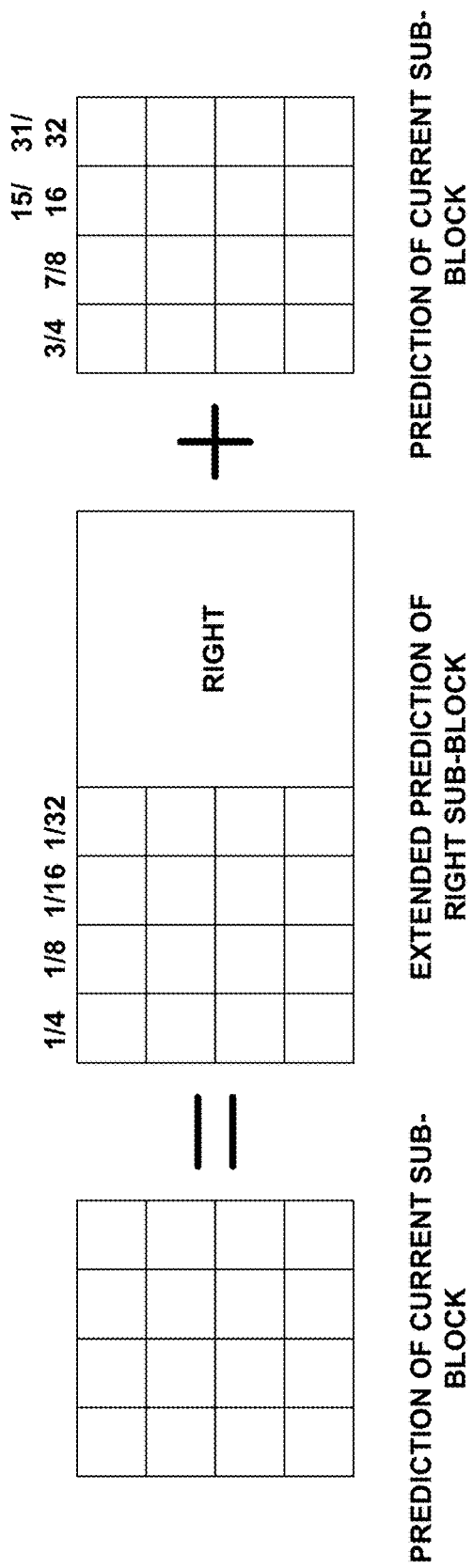

In JEM4.0, when LIC, affine, sub-CU merge candidate or FRUC is selected for one CU, the DMVD is not applied FIGS. 10A and 10B are conceptual diagrams showing an example illustration of sub-blocks where overlapped block motion compensation (OBMC) may apply, such as the OBMC included in JEM. OBMC has been used for early generations of video standards, e.g., as in H.263. In JEM, the OBMC is performed for all Motion Compensated (MC) block boundaries except the right and bottom boundaries of a CU. Moreover, it is applied for both luma and chroma components. In JEM, a MC block is corresponding to a coding block. When a CU is coded with sub-CU mode (includes sub-CU merge, Affine and FRUC mode, as described in Kaiming He, Jian Sun, and Xiaoou Tang, "Guided image filtering," Pattern Analysis and Machine Intelligence, IEEE Transactions on, vol. 35, no. 6, pp. 1397-1409, 2013), each sub-block of the CU is a MC block. To process CU boundaries in a uniform fashion, OBMC is performed at sub-block level for all MC block boundaries, where sub-block size is set equal to 4×4, as illustrated in FIGS. 10A and 10B.

When OBMC applies to the current sub-block, besides current motion vectors, motion vectors of four connected neighboring sub-blocks, if available and are not identical to the current motion vector, are also used to derive prediction block for the current sub-block. These multiple prediction blocks based on multiple motion vectors are combined to generate the final prediction signal of the current sub-block.

FIGS. 11A-11D are conceptual diagrams showing examples of overlapped block motion compensation weightings. As shown in FIGS. 11A-11D, prediction block based on motion vectors of a neighboring sub-block is denoted as $P_N$, with N indicating an index for the neighboring above, below, left and right sub-blocks and prediction block based on motion vectors of the current sub-block is denoted as $P_C$. When $P_N$ is based on the motion information of a neighboring sub-block that contains the same motion information to the current sub-block, the OBMC is not performed from $P_N$. Otherwise, every pixel of $P_N$ is added to the same pixel in $P_C$, i.e., four rows/columns of $P_N$ are added to $P_C$. The weighting factors {1/4, 1/8, 1/16, 1/32} are used for $P_N$ and the weighting factors {3/4, 7/8, 15/16, 31/32} are used for $P_C$. The exception are small MC blocks, (i.e., when height or width of the coding block is equal to 4 or a CU is coded with sub-CU mode), for which only two rows/columns of $P_N$ are added to $P_C$. In this case weighting factors {1/4, 1/8} are used for $P_N$ and weighting factors {3/4, 7/8} are used for $P_C$. For $P_N$ generated based on motion vectors of vertically (horizontally) neighboring sub-block, pixels in the same row (column) of $P_N$ are added to $P_C$ with a same weighting factor. It is noted that BIO is also applied for the derivation of the prediction block Pn.

In JEM, for a CU with size less than or equal to 256 luma samples, a CU level flag is signaled to indicate whether OBMC is applied or not for the current CU. For the CUs with size larger than 256 luma samples or not coded with AMVP mode, OBMC is applied by default. At encoder, when OBMC is applied for a CU, its impact is taken into account during motion estimation stage. The prediction signal by using motion information of the top neighboring block and the left neighboring block is used to compensate the top and left boundaries of the original signal of the current CU, and then the normal motion estimation process is applied.

The techniques of this disclosure may address some or all of the issues introduced above. All the DMVD-related methods (BIO, FRUC Bilateral Matching, FRUC Template Matching, Bilateral Template matching and so on) may provide significant bit-rate reductions. However, the coding complexity of the DMVD methods are high. Moreover, there is redundant signaling in the current FRUC design. This disclosure introduces techniques that may modify and/or simplify DMVD. The techniques of this disclosure are described below. The described techniques may be applied individually. In some examples, any combination of them may be applied.

The techniques of this disclosure include on/off controls for DMVD modes. In one example, video decoder 30 may explicitly determine the on/off of the DMVD modes by the signaled syntax in the bitstreams. In another example, video decoder 30 may implicitly determine the on/off of the DMVD modes based on the coded information. The coding information may include but not limited to the coded modes of spatial or temporal neighboring blocks, the coded modes of current block, the POC information of current POC and the reference pictures POC or the Low-delay condition (LDC) of current slice and so on. The Low-delay condition (LDC) is a condition whether all the reference pictures of current slice are before the current slice in terms of display order. When all the reference pictures of a current slice are all before the current slice, the LDC is set to true; otherwise, the LDC is set to false.

In one example, video decoder 30 may determine that the sub-block level FRUC template Matching is enabled based on the LDC of the current slice being true and determine that sub-block level FRUC template matching is disabled based on the LDC of the current slice being false.

The techniques of this disclosure also include constraints for DMVD modes. In one example, the MV derivation of DMVD modes is constrained to be performed on some conditions. Example conditions are described below, but other conditions may also be used.

In a first example, video decoder 30 may only perform MV derivation when the reference index is equal to one or several predetermined number N. In some examples, N may be equal to 0, an index of 0 corresponding to the first picture in a reference picture list, which may frequently be the reference picture that provides the best prediction due to the first reference picture being nearest to the current picture of having a lowest quantization parameter. This condition may be checked for List 0 or List1 separately or jointly. In one example, when current block is a bi-prediction inter block and is checked jointly, MV derivation is only performed when both L0 and L1 reference index are equal to one or several predetermined number N (e.g. N=0). In another example, when checked separately, MV derivation is performed when either L0 and L1 reference index is equal to one or several predetermined number N (e.g. N=0).

In a second example, for a DMVD mode, video decoder 30 may only use a MV candidate when the MV candidate is within a pre-determined range. The range can be pre-defined or signaled in the bitstream. The pre-determined range may limit the number of motion vectors that have to be checked and thus reduce memory access bandwidth and overall coding complexity.

In a third example, for a DMVD mode, video decoder 30 may only perform MV derivation when the POC distance between the reference picture and current picture is smaller than or equal to a predetermined number N (e.g. N=4). Video decoder 30 may check this condition for List 0 or List1 separately or jointly. In one example, when checked jointly, video decoder 30 may only perform MV derivation when the POC distance between the reference picture and current picture is smaller than or equal to a predetermined number N (e.g., N=4) for both lists. In another example, when checked jointly, video decoder 30 may only perform MV derivation when the POC distance between the reference picture and current picture is smaller than or equal to a predetermined number N (e.g. N=4) for either L0 or L1.

In another example, video decoder 30 may first derive an initial motion vector for a CU coded using a FRUC bilateral matching or a FRUC template matching mode for the following local search. Video decoder 30 may test only the MV candidate which has reference index equal to zero for both list0 and list1 to select the initial motion vector for further refinement. In another example, video decoder 30 may first derive an initial motion vector for a CU coded using FRUC bilateral matching or FRUC template matching mode for the following local search. Only the MV candidate which are within a range are tested to select the initial motion vector for further refinement. In another example, the Bilateral Template Matching is not applied to the MVs which has non-zero reference index in either List0 or List1 MVs. In another example, the BIO is not applied to the MVs which has non-zero reference index in either List0 or List1 MVs.

In another example, the on/off switch of BIO can be performed in a way that if the SAD between the interpolated pixels P0 and P1 is larger than a threshold, BIO is disabled as the motion trajectory of block may be sub-optimal in terms of finding the same objects. In another example, the SAD values between the template of the current reconstructed frame and the associated area in Ref0/Ref1 are calculated. If the ratio of the SAD values are far greater than 1 (or far less than 1), BIO is disabled. The threshold value can be pre-determined or signaled through SPS/PPS/Slice Header.

The techniques of this disclosure also include constraints of signaling fruc_mode. When the FRUC flag is true, an additional FRUC mode flag (or index) is signaled to indicate which method (bilateral matching or template matching) is to be used to derive motion information for the block. However, bilateral matching can work only when there is at least two different reference pictures for the current picture. In JEM, fruc_mode is signaled only when slice_type !=P_slice. However, even if the current picture is a B-slice, it is also possible that there is only one reference picture for the current picture, meaning there is only one reference picture in reference List 0 and only one reference picture in reference List 1, and the reference pictures are the same picture. In such a case, the decoder will perform in an unknown way if fruc_mode indicates bilateral matching being used. To address this issue, several solutions are proposed.

In one example, if there is only one reference picture in reference List 0 and only one reference picture in reference List 1, and the reference pictures are the same picture, then the fruc_mode flag (which indicates whether FRUC bilateral matching is applied for a block) may not be signaled. Other FRUC modes (e.g. template matching) may be done implicitly in this case. An exemplary syntax table is

```
    fruc_flag                              u(1)
    if(fruc_flag){
        if(slice_type != P_slice &&
           !(refList0_number == 1 &&
             refList1_number == 1 &&
    refList0_refPOC[0]        ==
refList1_refPOC[0])){
                fruc_mode                  u(1)
        }
    }
```

In another example, FRUC mode flag is signaled as defined in JEM. But it is omitted in case when bilateral matching cannot work. For example, when there is only one reference picture in reference List 0 and only one reference picture in reference List 1, and the reference pictures are the same picture, then the FRUC mode flag may be signaled, but the value of the FRUC mode flag may be omitted or ignored, meaning template matching will be applied regardless of whether the value of the FRUC mode flag is 0 or 1.

Figure 12:
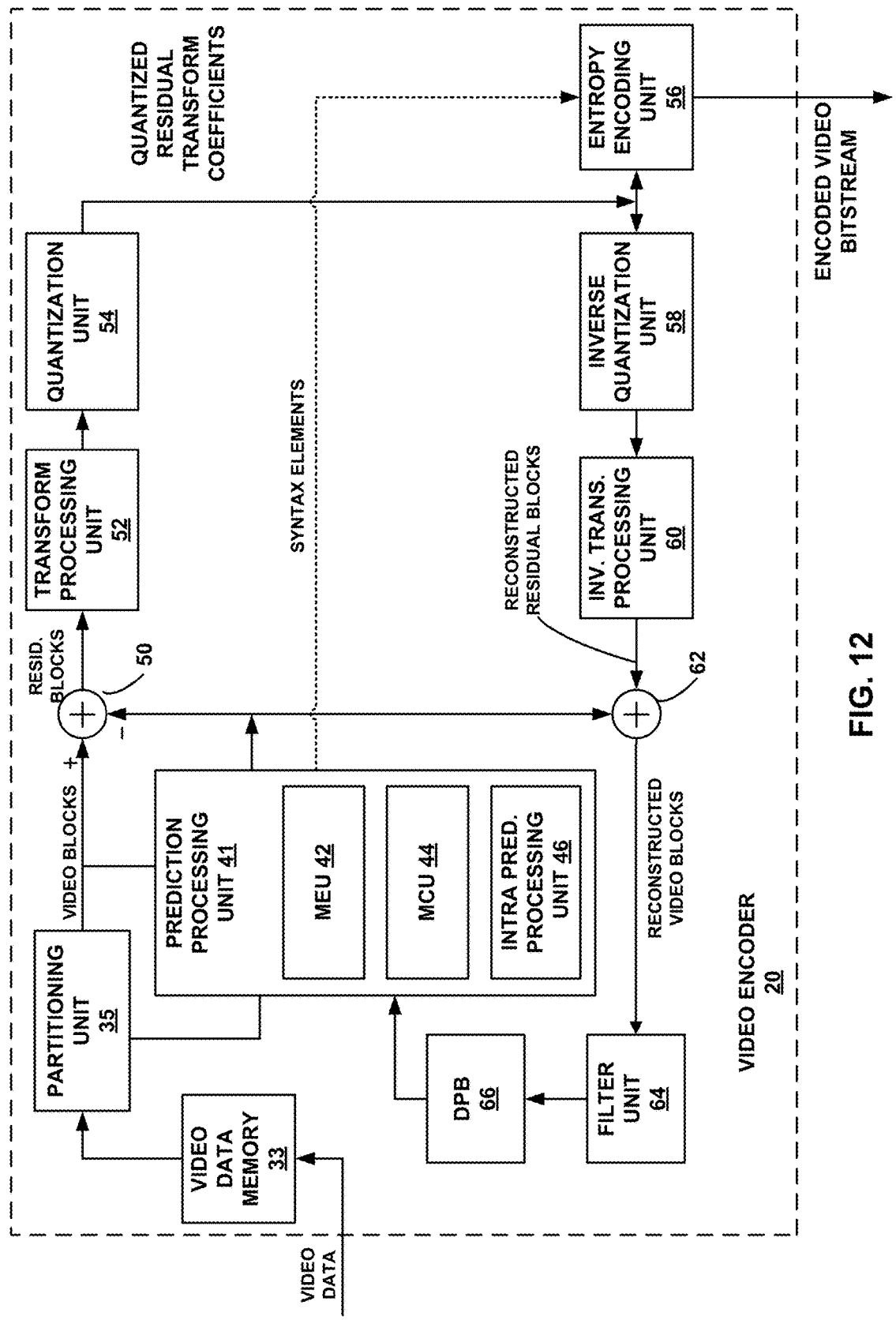
FIG. 12 is a block diagram illustrating an example of a video encoder that may implement techniques supporting decoder-side motion vector derivation.

FIG. 12 is a block diagram illustrating an example video encoder 20 that may implement the techniques described in this disclosure. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based compression modes. Inter-modes, such as uni-directional prediction (P mode) or bi-prediction (B mode), may refer to any of several temporal-based compression modes.

In the example of FIG. 12, video encoder 20 includes a video data memory 33, partitioning unit 35, prediction processing unit 41, summer 50, transform processing unit 52, quantization unit 54, entropy encoding unit 56. Prediction processing unit 41 includes motion estimation unit (MEU) 42, motion compensation unit (MCU) 44, and intra prediction unit 46. For video block reconstruction, video encoder 20 also includes inverse quantization unit 58, inverse transform processing unit 60, summer 62, filter unit 64, and decoded picture buffer (DPB) 66.

As shown in FIG. 12, video encoder 20 receives video data and stores the received video data in video data memory 33. Video data memory 33 may store video data to be encoded by the components of video encoder 20. The video data stored in video data memory 33 may be obtained, for example, from video source 18. DPB 66 may be a reference picture memory that stores reference video data for use in encoding video data by video encoder 20, e.g., in intra- or inter-coding modes. Video data memory 33 and DPB 66 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 33 and DPB 66 may be provided by the same memory device or separate memory devices. In various examples, video data memory 33 may be on-chip with other components of video encoder 20, or off-chip relative to those components.

Partitioning unit 35 retrieves the video data from video data memory 33 and partitions the video data into video blocks. This partitioning may also include partitioning into slices, tiles, or other larger units, as wells as video block partitioning, e.g., according to a quadtree structure of LCUs and CUs. Video encoder 20 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra coding modes or one of a plurality of inter coding modes, for the current video block based on error results (e.g., coding rate and the level of distortion). Prediction processing unit 41 may provide the resulting intra- or inter-coded block to summer 50 to generate residual block data and to summer 62 to reconstruct the encoded block for use as a reference picture.

Intra prediction unit 46 within prediction processing unit 41 may perform intra-predictive coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block relative to one or more predictive blocks in one or more reference pictures to provide temporal compression. Motion estimation unit 42 and motion compensation unit 44 may be configured to perform DMVD in accordance with the techniques described in this disclosure.

Motion estimation unit 42 may be configured to determine the inter-prediction mode for a video slice according to a predetermined pattern for a video sequence. The predetermined pattern may designate video slices in the sequence as P slices or B slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in DPB 66. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in DPB 66. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in one of the reference picture lists. Video encoder 20 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by video decoder 30 in decoding the video blocks of the video slice.

After prediction processing unit 41 generates the predictive block for the current video block, either via intra prediction or inter prediction, video encoder 20 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. In another example, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. Following the entropy encoding by entropy encoding unit 56, the encoded bitstream may be transmitted to video decoder 30, or archived for later transmission or retrieval by video decoder 30. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within one of the reference picture lists. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed block.

Filter unit 64 filters the reconstructed block (e.g. the output of summer 62) and stores the filtered reconstructed block in DPB 66 for uses as a reference block. The reference block may be used by motion estimation unit 42 and motion compensation unit 44 as a reference block to inter-predict a block in a subsequent video frame or picture. Filter unit 64 is intended to represent any or any combination of a deblock filter, a sample adaptive offset (SAO) filter, and adaptive loop filter (ALF), or any other type of loop filters. A deblock filter may, for example, apply deblocking filtering to filter block boundaries to remove blockiness artifacts from reconstructed video. An SAO filter may apply offsets to reconstructed pixel values in order to improve overall coding quality. Additional loop filters (in loop or post loop) may also be used.

Figure 13:
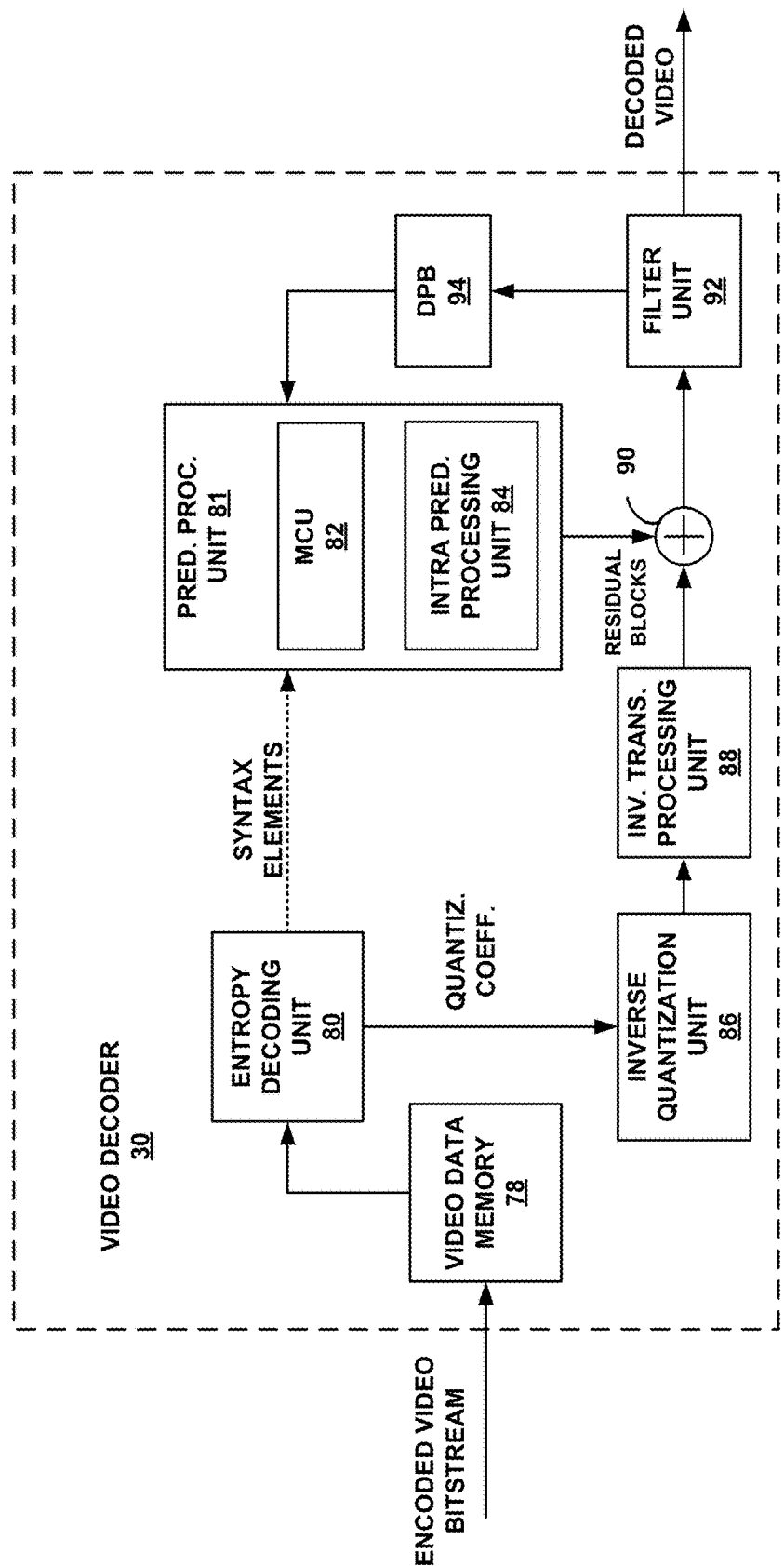
FIG. 13 is a block diagram illustrating an example of a video decoder, which decodes an encoded video sequence and performs decoder-side motion vector derivation.

FIG. 13 is a block diagram illustrating an example video decoder 30 that may implement the techniques described in this disclosure. Video decoder 30 of FIG. 13 may, for example, be configured to receive the signaling described above with respect to video encoder 20 of FIG. 12. In the example of FIG. 13, video decoder 30 includes video data memory 78, entropy decoding unit 80, prediction processing unit 81, inverse quantization unit 86, inverse transform processing unit 88, summer 90, filter unit 92, and DPB 94. Prediction processing unit 81 includes motion compensation unit 82 and intra prediction unit 84. Video decoder 30 may, in some examples, perform a decoding pass generally reciprocal to the encoding pass described with respect to video encoder 20 from FIG. 12.

During the decoding process, video decoder 30 receives an encoded video bitstream that represents video blocks of an encoded video slice and associated syntax elements from video encoder 20. Video decoder 20 stores the received encoded video bitstream in video data memory 78. Video data memory 78 may store video data, such as an encoded video bitstream, to be decoded by the components of video decoder 30. The video data stored in video data memory 78 may be obtained, for example, via link 16, from storage device 26, or from a local video source, such as a camera, or by accessing physical data storage media. Video data memory 78 may form a coded picture buffer (CPB) that stores encoded video data from an encoded video bitstream. DPB 94 may be a reference picture memory that stores reference video data for use in decoding video data by video decoder 30, e.g., in intra- or inter-coding modes. Video data memory 78 and DPB 94 may be formed by any of a variety of memory devices, such as DRAM, SDRAM, MRAM, RRAM, or other types of memory devices. Video data memory 78 and DPB 94 may be provided by the same memory device or separate memory devices. In various examples, video data memory 78 may be on-chip with other components of video decoder 30, or off-chip relative to those components.

Entropy decoding unit 80 of video decoder 30 entropy decodes the video data stored in video data memory 78 to generate quantized coefficients, motion vectors, and other syntax elements. Entropy decoding unit 80 forwards the motion vectors and other syntax elements to prediction processing unit 81. Video decoder 30 may receive the syntax elements at the video slice level and/or the video block level.

When the video slice is coded as an intra-coded (I) slice, intra prediction unit 84 of prediction processing unit 81 may generate prediction data for a video block of the current video slice based on a signaled intra prediction mode and data from previously decoded blocks of the current frame or picture. When the video frame is coded as an inter-coded slice (e.g., B slice or P slice), motion compensation unit 82 of prediction processing unit 81 produces predictive blocks for a video block of the current video slice based on the motion vectors and other syntax elements received from entropy decoding unit 80. The predictive blocks may be produced from one of the reference pictures within one of the reference picture lists. Video decoder 30 may construct the reference frame lists, List 0 and List 1, using default construction techniques based on reference pictures stored in DPB 94.

Motion compensation unit 82, in conjunction with other parts of video decoder 30, may be configured to perform DMVD in accordance with the techniques described in this disclosure. Motion compensation unit 82 determines prediction information for a video block of the current video slice by parsing the motion vectors and other syntax elements, and uses the prediction information to produce the predictive blocks for the current video block being decoded. For example, motion compensation unit 82 uses some of the received syntax elements to determine a prediction mode (e.g., intra- or inter-prediction) used to code the video blocks of the video slice, an inter-prediction slice type (e.g., B slice or P slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by video encoder 20 during encoding of the video blocks to calculate interpolated values for sub-integer pixels of reference blocks. In this case, motion compensation unit 82 may determine the interpolation filters used by video encoder 20 from the received syntax elements and use the interpolation filters to produce predictive blocks.

Inverse quantization unit 86 inverse quantizes, i.e., dequantizes, the quantized transform coefficients provided in the bitstream and decoded by entropy decoding unit 80. The inverse quantization process may include use of a quantization parameter calculated by video encoder 20 for each video block in the video slice to determine a degree of quantization and, likewise, a degree of inverse quantization that should be applied. Inverse transform processing unit 88 applies an inverse transform, e.g., an inverse DCT, an inverse integer transform, or a conceptually similar inverse transform process, to the transform coefficients in order to produce residual blocks in the pixel domain.

After prediction processing unit generates the predictive block for the current video block using, for example, intra or inter prediction, video decoder 30 forms a reconstructed video block by summing the residual blocks from inverse transform processing unit 88 with the corresponding predictive blocks generated by motion compensation unit 82. Summer 90 represents the component or components that perform this summation operation.

Filter unit 92 represents any or any combination of a deblocking filter, an SAO filter, and ALF, or any other type of loop filter (either in the coding loop or after the coding loop). The decoded video blocks in a given frame or picture are then stored in DPB 94, which stores reference pictures used for subsequent motion compensation. DPB 94 may be part of or separate from additional memory that stores decoded video for later presentation on a display device, such as display device 32 of FIG. 1.

Figure 14:
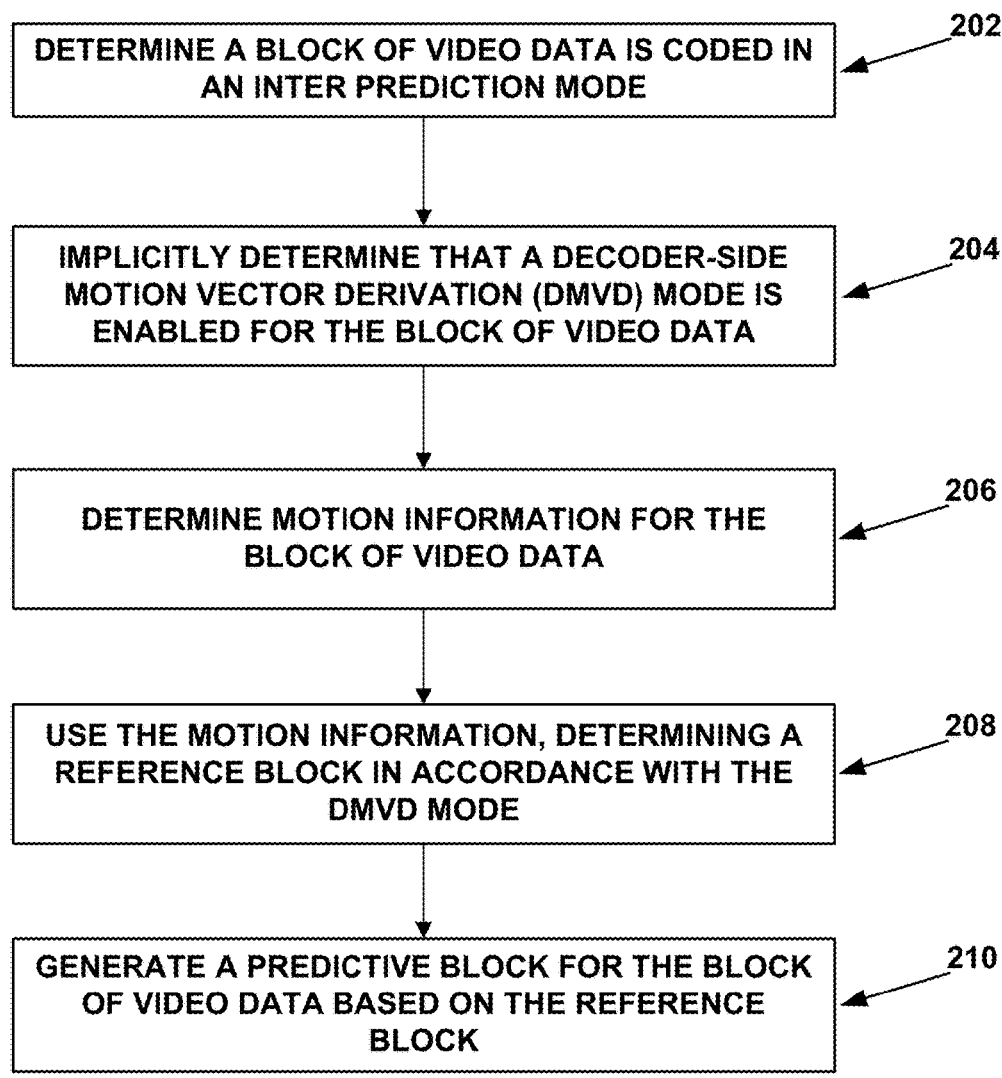
FIG. 14 is a flowchart illustrating an example method of decoding video data in accordance with techniques described in this disclosure.

FIG. 14 is a flow diagram illustrating an example video decoding technique described in this disclosure. The techniques of FIG. 14 will be described with reference to a generic video decoder, such as but not limited to video decoder 30. In some instances, the techniques of FIG. 14 may be performed by a video encoder such as video encoder 20, in which case the generic video decoder corresponds to the decoding loop of the video encoder.

In the example of FIG. 14, the video decoder determines a block of video data is coded in an inter prediction mode (202). The video decoder implicitly determines that a DMVD mode is enabled for the block of video data (204). The DMVD mode may, for example, be one of a pattern matched motion vector derivation mode, a bi-directional optical flow mode, a bilateral template matching mode, or an overlapped block motion compensation mode, or another DMVD mode.

In one example, to implicitly determine that the DMVD mode is enabled for the block of video data, the video decoder may determine that the DMVD mode is enabled for the block of video data based on modes used to code one or more neighboring blocks of the block of video data. The one or more neighboring blocks may be either temporal neighboring blocks or spatial neighboring blocks. In another example, to implicitly determine that the DMVD mode is enabled for the block of video data, the video decoder may determine that the DMVD mode (e.g., a FRUC template matching mode) is enabled for the block of video data in response to a low-delay condition for a current slice comprising the block of video data being true, where the low-delay condition requires all reference pictures of the current slice to be before the current slice in display order.

In another example, to implicitly determine that the DMVD mode is enabled for the block of video data, the video decoder may determine that the DMVD mode is enabled for the block of video data in response to the block of video data being a B-slice, a first reference picture list for the block of video data including only one reference picture, a second reference picture list for the block of video data including only one reference picture, and the only one reference picture of the first reference picture list and the only one reference picture of the second reference picture list being a same reference picture. In another example, to determine the motion information for the block of video data, the video decoder may determine a reference index for the block of video data, and to implicitly determine that the DMVD mode is enabled for the block of video data, the video decoder may determine that the DMVD mode is enabled for the block of video data in response to determining that a value of the reference index for the block of video data is equal to zero.

The video decoder determines motion information for the block of video data (206). The motion information, for example, includes some or all of a motion vector, a motion vector precision, and a reference picture index. The video decoder uses the motion information to determine a reference block in accordance with the DMVD mode (208). The video decoder generates a predictive block for the block of video data based on the reference block (210). The video decoder may add residual data to the predictive block to generate a reconstructed block of video data and process the reconstructed block of video data to generate a decoded block of video data. The processing may, for example, includes one or more in-loop or post-loop filtering operations.

The video decoder outputs the decoded block of video data. In instances where the video decoder is part of a video encoder, then the video decoder may output the decoded block of video data by storing a picture including the decoded block of video data in a decoded picture buffer for use as reference picture in encoding subsequent pictures of video data. In instances where the video decoder is decoding the video data for display, then the video decoder may output the decoded block of video data by storing a picture including the decoded block of video data in a decoded picture buffer for use as reference picture in decoding subsequent pictures of video data and by outputting the picture including the decoded block of video data to a display device.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or

What is claimed is:

1. A method of decoding video data, the method comprising:
   determining a block of video data is coded in an inter prediction mode;
   implicitly determining that a decoder-side motion vector derivation (DMVD) mode is enabled for the block of video data, wherein implicitly determining that the DMVD mode is enabled for the block of video data comprises determining that the DMVD mode is enabled for the block of video data in response to:
      the block of video data being a B-slice;
      a first reference picture list for the block of video data including only one reference picture;
      a second reference picture list for the block of video data including only one reference picture; and
      the only one reference picture of the first reference picture list and the only one reference picture of the second reference picture list being a same reference picture;
   determining motion information for the block of video data;
   using the motion information, determining a reference block in accordance with the DMVD mode; and
   generating a predictive block for the block of video data based on the reference block.

2. The method of claim 1, wherein the motion information comprises some or all of a motion vector, a motion vector precision, and a reference picture index.

3. The method of claim 1, wherein the DMVD mode comprises one of a pattern matched motion vector derivation mode, a bi-directional optical flow mode, a bilateral template matching mode, or an overlapped block motion compensation mode.

4. The method of claim 1, further comprising:
   adding residual data to the predictive block to generate a reconstructed block of video data;
   processing the reconstructed block of video data to generate a decoded block of video data;
   outputting the decoded block of video data.

5. The method of claim 1, wherein the method is performed as part of a decoding loop of a video encoding process.

6. A device for decoding video data, the device comprising:
   a memory configured to store the video data; and
   one or more processors configured to:
      determine a block of video data is coded in an inter prediction mode;
      implicitly determine that a decoder-side motion vector derivation (DMVD) mode is enabled for the block of video data, wherein the one or more processors implicitly determine that the DMVD mode is enabled for the block of video data in response to:
         the block of video data being a B-slice;
         a first reference picture list for the block of video data including only one reference picture;
         a second reference picture list for the block of video data including only one reference picture; and
         the only one reference picture of the first reference picture list and the only one reference picture of the second reference picture list being a same reference picture;
      determine motion information for the block of video data;
      use the motion information, determining a reference block in accordance with the DMVD mode; and
      generate a predictive block for the block of video data based on the reference block.

7. The device of claim 6, wherein the motion information comprises some or all of a motion vector, a motion vector precision, and a reference picture index.

8. The device of claim 6, wherein the DMVD mode comprises one of a pattern matched motion vector derivation mode, a bi-directional optical flow mode, a bilateral template matching mode, or an overlapped block motion compensation mode.

9. The device of claim 6, wherein the one or more processors are configured to:
   add residual data to the predictive block to generate a reconstructed block of video data;
   process the reconstructed block of video data to generate a decoded block of video data;
   output the decoded block of video data.

10. The device of claim 6, wherein the device is configured to decode the video data as part of a decoding loop of a video encoding process.

11. The device of claim 6, wherein the device comprises a wireless communication device, further comprising a receiver configured to receive encoded video data.

12. The device of claim 11, wherein the wireless communication device comprises a telephone handset and wherein the receiver is configured to demodulate, according to a wireless communication standard, a signal comprising the encoded video data.

13. The device of claim 6, wherein the device comprises a wireless communication device, further comprising a transmitter configured to transmit encoded video data.

14. The device of claim 13, wherein the wireless communication device comprises a telephone handset and wherein the transmitter is configured to modulate, according to a wireless communication standard, a signal comprising the encoded video data.

15. A non-transitory computer-readable storage medium storing instructions that when executed by one or more processors cause the one or more processors to:
   determine a block of video data is coded in an inter prediction mode;
   implicitly determine that a decoder-side motion vector derivation (DMVD) mode is enabled for the block of video data, wherein the instructions cause the one or more processors to implicitly determine that the DMVD mode is enabled for the block of video data in response to:
      the block of video data being a B-slice;
      a first reference picture list for the block of video data including only one reference picture;
      a second reference picture list for the block of video data including only one reference picture; and
      the only one reference picture of the first reference picture list and the only one reference picture of the second reference picture list being a same reference picture;
   determine motion information for the block of video data;
   use the motion information, determining a reference block in accordance with the DMVD mode; and
   generate a predictive block for the block of video data based on the reference block.

16. The non-transitory computer-readable storage medium of claim 15, wherein the motion information comprises some or all of a motion vector, a motion vector precision, and a reference picture index.

17. The non-transitory computer-readable storage medium of claim 15, wherein the DMVD mode comprises one of a pattern matched motion vector derivation mode, a bi-directional optical flow mode, a bilateral template matching mode, or an overlapped block motion compensation mode.

18. The non-transitory computer-readable storage medium of claim 15, storing further instructions that when executed by the one or more processors cause the one or more processors to:
   add residual data to the predictive block to generate a reconstructed block of video data;
   process the reconstructed block of video data to generate a decoded block of video data;
   output the decoded block of video data.

\* \* \* \* \*